(12) United States Patent
Zschau et al.

(10) Patent No.: US 9,448,532 B2
(45) Date of Patent: Sep. 20, 2016

(54) METHOD AND DEVICE FOR ENCODING THREE-DIMENSIONAL SCENES WHICH INCLUDE TRANSPARENT OBJECTS IN A HOLOGRAPHIC SYSTEM

(75) Inventors: Enrico Zschau, Dresden (DE); Nils Pfeifer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 652 days.

(21) Appl. No.: 13/638,782

(22) PCT Filed: Apr. 1, 2011

(86) PCT No.: PCT/EP2011/055144
§ 371 (c)(1),
(2), (4) Date: Oct. 1, 2012

(87) PCT Pub. No.: WO2011/121130
PCT Pub. Date: Oct. 6, 2011

(65) Prior Publication Data
US 2013/0022222 A1  Jan. 24, 2013

(30) Foreign Application Priority Data

Apr. 1, 2010  (EP) .................................... 10158996

(51) Int. Cl.
G03H 1/08 (2006.01)
G03H 3/00 (2006.01)
G03H 1/22 (2006.01)

(52) U.S. Cl.
CPC .............. *G03H 1/0808* (2013.01); *G03H 3/00* (2013.01); *G03H 1/2294* (2013.01); *G03H 2001/2242* (2013.01); *G03H 2210/12* (2013.01); *G03H 2210/30* (2013.01); *G03H 2210/36* (2013.01); *G03H 2210/452* (2013.01);

(Continued)

(58) Field of Classification Search
None
See application file for complete search history.

(56) References Cited

U.S. PATENT DOCUMENTS 7,030,887 B2    4/2006 Andrews
2006/0055994 A1*  3/2006 Schwerdtner ............ G03H 1/08
                                                  359/15

(Continued)

FOREIGN PATENT DOCUMENTS

DE   10353439 A1   6/2004
JP   10-288938    10/1998

(Continued)

OTHER PUBLICATIONS

International Search Report, dated Oct. 19, 2011, issued in priority International Application No. PCT/EP2011/055144.

(Continued)

*Primary Examiner* — Xiao Wu
*Assistant Examiner* — Steven Elbinger
(74) *Attorney, Agent, or Firm* — Saul Ewing LLP

(57) ABSTRACT

Method for computing the code for the reconstruction of three-dimensional scenes which include objects which partly absorb light or sound. The method can be implemented in a computing unit. In order to reconstruct a three-dimensional scene as realistic as possible, the diffraction patterns are computed separately at their point of origin considering the instances of absorption in the scene. The method can be used for the representation of three-dimensional scenes in a holographic display or volumetric display. Further, it can be carried out to achieve a reconstruction of sound fields in an array of sound sources.

10 Claims, 12 Drawing Sheets

(52) U.S. Cl.
CPC ..... *G03H 2210/63* (2013.01); *G03H 2226/02* (2013.01); *G03H 2226/05* (2013.01); *G03H 2240/56* (2013.01)

(56) References Cited

U.S. PATENT DOCUMENTS

| | | | |
|---|---|---|---|
| 2006/0139711 A1* | 6/2006 | Leister | G03H 1/0808 359/9 |
| 2007/0216978 A1 | 9/2007 | Kitamura et al. | |
| 2008/0111832 A1* | 5/2008 | Emam | G02B 27/017 345/633 |
| 2010/0034404 A1* | 2/2010 | Dent | 381/310 |
| 2010/0073744 A1 | 3/2010 | Zschau et al. | |
| 2010/0328433 A1* | 12/2010 | Li | 348/46 |
| 2011/0157183 A1* | 6/2011 | Kaule et al. | 345/428 |

FOREIGN PATENT DOCUMENTS

| | | |
|---|---|---|
| JP | 10288938 A * | 10/1998 |
| WO | 2006/066919 A1 | 6/2006 |
| WO | WO 2008025839 A1 * | 3/2008 |

OTHER PUBLICATIONS

Yamaguchi et al., "Computer generated hologram with characteristics of reflection: reflectance distributions and reflected images," Applied Optics, Optical Society of America, vol. 48, No. 34, pp. H203-H211 (Dec. 2009).

Ezura et al., "Computer-generated holograms considering multiple reflection, transmission, and shadow on object surfaces," Proceedings of SPIE, vol. 5290, pp. 106-113 (Dec. 2003).

* cited by examiner

METHOD AND DEVICE FOR ENCODING THREE-DIMENSIONAL SCENES WHICH INCLUDE TRANSPARENT OBJECTS IN A HOLOGRAPHIC SYSTEM

CROSS REFERENCE TO RELATED APPLICATIONS

This application claims the priority of PCT/EP2011/055144, filed on Apr. 1, 2011, which claims priority to European Application No. 10158996.8, filed Apr. 1, 2010, the entire contents of all of which are hereby incorporated in total by reference.

BACKGROUND OF THE INVENTION

The present invention relates to a method for computing encoding values of object points of three-dimensional scenes which include transparent objects. It further relates to a computing unit in which this method is implemented.

The method can be applied for the computation of computer-generated holograms for holographic display systems or for the production of holograms (hard copy). It can further be used with other three-dimensional display systems where object points can be displayed separately in a staggered manner in space, such as volumetric displays.

Generally, the present invention can also be used for other wavelength ranges than the visible spectral range. In conjunction with an antenna array where always at least two antennas emit coherent radiation so that the emitted electromagnetic waves can interfere with each other, it can be used for simulating and reconstructing electromagnetic spectra, for example in the context of spatial analysis of cosmic radiation received by radio telescopes. The spectral range which is used for such simulation or reconstruction does not necessarily have to correspond with the spectral range which is to be analysed, but can be imaged onto the former by way of transformation.

The present invention can further be applied to other media than the electromagnetic spectrum, e.g. to sound waves. In conjunction with an array of sound generating means where always at least two sound generating means can be controlled to emit coherent waves so that the emitted sound waves can interfere with each other, it can be used for simulating and reconstructing three-dimensional sound fields, where this invention shall not be limited to the audible sound frequency range. The sound fields comprise spatial and temporal varying sound values of three-dimensional scenes which include objects with sound-absorbing properties. The method and computing device can also be used to generate antiphase sound for reducing noise not only on a small place but also in a large environment.

The method can also be used for display and analysis of other spatial distributions, which can also be of non-optical nature. Three-dimensional distributions of physical and other parameters are imaged to transparency values, three-dimensional objects and light sources (false-colour imaging). It is for example preferably possible to visualise or analyse various tomographic methods, 3D ultrasonic checks or the distribution of mechanical stress in workpieces.

A holographic display system (in the following also simply denoted as a holographic system) according to this patent application is a display device for three-dimensional object data where the three-dimensional object data of the scene to be represented are encoded in the form of diffraction patterns of the scene to be reconstructed. Especially the computation of the diffraction patterns will be referred herein as encoding, and a number of encoding methods as such are already known.

The encoding can be achieved by generating aggregate holograms of the information of all object points, which can, however, easily cause a great computational load in particular with high-resolution display systems.

According to a further method, the hologram is divided into individual adjoining regions of same size (hogels) in order to minimise the computational load. Each region thus corresponds with an identical number of cells of the spatial light modulator (SLM) used. Each hogel carries information on a number of object points and on a multitude of diffraction angles (hogel vectors). The simplification is achieved in that pre-computed diffraction patterns can be retrieved from a look-up table (LUT) when computing the hogels.

Alternatively, the computation can be carried out separately for individual object points in the form of sub-holograms. Each sub-hologram is only written to a sub-region of the modulator surface of the optical light modulator (or spatial light modulator, SLM) which is used for the reconstruction. The individual sub-holograms can partly or wholly overlap on the modulator surface, depending on the position of the object points. This method can particularly preferably be applied if the hologram shall only be encoded for a small visibility region, where a at least one means is provided for tracking one or multiple visibility regions which are assigned to an observer eye to the movements of observer eyes of one or multiple observers. Such a holographic display device has for example been described by the applicant in document DE 103 53 439 B4 and in document WO 2006/066919 A1. The sub-holograms correspond with diffraction lenses which focus the desired object point with the desired brightness or with the desired brightness and colour at the desired distance to the modulator surface. The function of a convex lens is used to generate an object point in front of the modulator surface. The function of a concave lens is used to generate a virtual object point behind the modulator surface. An object point which lies in the modulator surface is generated directly. The lens functions can again be pre-computed and stored in a look-up table. When encoding the diffraction patterns, additional parameters, which can e.g. take into account the transfer functions of the used modulator regions of the SLM, light sources and other optical components in the optical path, can be considered. This also includes techniques which aim to reduce speckle.

Since in most displays individual pixels are represented on a planar SLM surface, a pixelated 2D image or a stereoscopic 3D representation which comprises at least two different 2D images (3D display) can be shown directly on those displays without much adaptation efforts needed. Necessary adaptations relate mainly to scaling the region to be represented to the resolution of the display panel and to brightness and colour adaptations to the gradation of the display panel. In a 3D display, multiple views of a stereoscopic representation must be encoded temporally and/or spatially on the modulator surface, depending on the used method. 2D vector graphics images must be transformed into raster graphics images before they can be displayed.

Before a three-dimensional scene can be represented on a 2D display or on a 3D display, or before it can be encoded for reconstruction in a holographic display, views must be generated from the three-dimensional data records which describe the objects of the scene with their properties. This process is also referred to as image synthesis or rendering. A number of methods are known for this which differ in the kind of scene description, the desired quality of the views and the way these views are actually generated.

For example, a 3D CAD model comprises geometric descriptions of the objects it includes in a three-dimensional coordinate system. In addition, a number of further physical properties can be defined to describe the materials of the objects, including optical properties such as reflectivity and emissivity of opaque objects and, additionally, refractive index and absorptivity of transparent objects. With homogeneous objects, it is sufficient that these parameters are defined for the boundary surfaces only. Generally, these properties can show not only a spatial gradient, and they can depend on one or multiple other parameters, such as wavelength and polarisation.

The data can also already exist in the form of volumetric pixel data. This is often the case with medical applications, for example. The 3D scene is divided into individual spatial points or small spatial regions (voxels) already when it is generated.

It is for example also possible that a 3D scene is generated from pixelated 2D data in combination with a depth map. The distance of each pixel to a reference plane is stored in the depth map. Such a data format is for example used for video data which shall be represented both on a 2D monitor and, additionally, on various 3D display devices. It facilitates the generation of multiple views of one scene. However, additional data must be provided to be able to consider hidden objects.

At the beginning of the image synthesis, a position must be chosen for each view to be generated in the three-dimensional coordinate system which serves to describe the location of objects in the scene, said position corresponding with the position of a camera with which a view of the scene could be recorded (virtual camera). Further, the virtual position and virtual size in the scene of the active modulator surface of the SLM which is used for image generation must be defined. The virtual size of the active modulator surface can differ from its actual size, e.g. if a scanning arrangement or a projection arrangement is used. The position of the virtual camera defines the position from which and the direction in which an observer eye would perceive the scene. This position can also lie between objects or in an object. The properties of the virtual camera such as focal length and viewing angle determine which section is displayed at which virtual magnification. The viewing angle is determined by the virtual area of the SLM and its position in relation to the virtual camera. The beams which originate in the position of the virtual camera and run through the borders of the virtual area of the SLM define a space which represents the visibility region. Parts of the scene which lie outside this pyramid cannot be displayed. In a 2D display the same view is generated for either observer eye, so that only perspective views are possible. By moving the virtual cameras for either observer eye in synchronism, the observer can virtually move through a scene during an image sequence while the observer does not have to move physically in front of the display. If the movement of the observer eyes in front of the display is detected by a sensor, the movement of the virtual camera can also be controlled based on this information. Further imaging means can be disposed between the virtual modulator surface and the observer eye. These imaging means can be included in the area of the virtual modulator surface and/or considered in the properties of the virtual camera.

In a holographic display, true depth information can be generated with the help of diffraction patterns. This gives an observer the possibility to focus at different depth planes of the reconstructed scene (accommodation) without the need to change the reconstruction. Therefore, it is rather referred to a virtual observer position than to a virtual camera in the context of a holographic display.

In the further course of image synthesis, it is determined which parts of the scene lie inside the visibility region and which parts are actually visible, e.g. which are not hidden behind other parts of the scene. This can be a multi-stage process, where the effort to be taken is the greater the more complex the scene or the more realistic the desired representation. Depending on the material properties and position of the light sources in the scene, it is possible to consider reflections, diffraction, refraction and scattering, which may in turn bring about further visible virtual objects, surfaces or points which are generated by parts of the scene which are visible, hidden and/or which lie outside the visibility region.

The appearance of the surfaces in the scene can be computed considering the material properties of the objects (shading). This includes for example an imaging of textures to the surfaces of the objects (texture mapping). Because the image synthesis is a very complex process, the appearance of objects, surfaces and individual image points can change several times during the image synthesis.

If the scene includes structured light sources, then their influence (illumination, shading) can be considered by adapting the appearance of surfaces, where often simplified illumination models are used in order to minimise the computational load. The reflectivity of the surfaces is often computed using bidirectional reflectance distribution functions (BRDF).

Recursive ray tracing methods are often used to generate the actual view of the scene. This means that the path of individual rays of light which are defined by a display pixel and the position of the virtual camera is traced back. First, all points at which the ray pierces through non-hidden surfaces of hit objects are determined and sorted by their distance to the virtual camera. Then, aggregate data is generated to describe a point of the view to be represented at the position of the corresponding display pixel, considering the appearance of all visible points involved. When generating this aggregated data, the transparency properties of all transparent points involved and, if there is one, of the opaque point are considered one after another. The transparency properties can be determined e.g. considering the material properties which determine the transparency and the optical path length which is covered by the ray of light in the material. Spectral and spatial distributions of these material properties can also be considered.

Such a method is described in U.S. Pat. No. 7,030,887 B2. Using multiple depth buffers in which depth information is stored, the transparent pixels which are mutually superposed are sorted by depth. This makes it possible to find the pixel which comes closest to an opaque pixel. Then, the transparency effect of this pixel in relation to the opaque pixel is computed. Then, it is found out whether or not there is an adjacent transparent pixel to the former transparent pixel. The transparency effect of this pixel is now computed in relation to the already computed transparency effect. This process is repeated until all superposed transparent pixels are considered. This method has the disadvantage that only one brightness value or one brightness value and one colour value is determined for each involved ray which corresponds to a pixel on the display panel.

There are similar problems when simulating sound fields in a room considering its acoustic and geometric properties (auralisation). Such simulations serve to circumvent extensive measurements in geometric models. Interrelations of sound sources of different location, movement, polar pattern and loudness and room acoustics can thus be tested. In addition to a having a certain position and form, individual objects in space or objects of the auditory scene also show wavelength-specific absorption and diffusion. The acoustic properties of a room are found in a multi-stage process, where recursive ray tracing methods are used as well. Again, it is possible to consider virtual sound sources, e.g. as caused by reflection, diffusion and deflection. The computed auditory sensation is typically rendered at the position of the virtual listener through stereo earphones, where the head-related transfer function (HRTF) must be considered for a realistic auditory sensation. It is a disadvantage here that it is only an aggregate signal that is rendered through the earphones. A round tour in a virtual room is nevertheless possible when re-computing the auditory sensation for the changed position of the listener, but a realistic auditory sensation without re-computing the sound signals after head movements is not possible.

The disadvantages when representing three-dimensional scenes which include transparent objects in a holographic display or volumetric display are overcome according to the present invention by the features of the method claimed in claim 1. As regards the field of acoustics, the disadvantages are overcome according to the present invention by the features of the method claimed in claim 8.

SUMMARY OF THE INVENTION

According to this invention, the inventive methods can be implemented in a computing unit comprising the features claimed in claim 10.

Further preferred embodiments and improvements of the present invention are defined in the dependent claims.

The method according to the invention can especially be used for computing holographic encoding values for an optical light modulator (SLM) of a holographic system for the reconstruction of three-dimensional scenes, which include objects with transparent properties, for at least one observer eye. The method comprises the steps of:

a) The three-dimensional scene is divided into individual object points and the coordinates of these object points are determined. With these coordinates, a sorting according to method step d) can be carried out or the coordinates of the object points might be used for other purposes in the computation of the holographic encoding values.

b) A virtual observer position is determined which corresponds with the position of a selected observer eye where the three-dimensional scene is apparently perceived.

c) All object points which are not fully covered by other object points as seen from the virtual observer position are determined and are to be encoded.

d) All visible object points to be encoded which are seen at the same angle from the virtual observer position are sorted by their distance to the virtual observer position.

e) The actual brightness of each visible object point is determined, if possible considering the location and intensity of all real and virtual light sources of the scene at the position of those object points at the angle at which they are seen from the virtual observer position, where the physical properties of the objects including the real and virtual light sources can be taken into account.

f) For each visible object point to be encoded an apparent brightness value with which the object point is perceived at the virtual observer position is determined considering its actual brightness at its actual position, the distance to the virtual observer position and the transparency properties of all objects or object points which are located between that visible object point and the virtual observer position.

g) Each object point is encoded separately with its respective brightness value such that it is reconstructed in the holographic system as far as possible at its position with that brightness value, so that opaque and transparent object points can be perceived separately at their respective positions.

It is noted that the holographic encoding values are also called hologram data or simply the hologram.

In case the holographic display uses or is configured for using small virtual observer windows, e.g. for a holographic system as described in WO 2006/066919 A1, wherein one virtual observer window is available for each eye of the observer, the computation of the holographic encoding values shall be carried out at least for each of the virtual observer windows, at which an eye of the observer is located. In case the holographic system comprises a tracking functionality of the virtual observer windows regarding to the actual position of the eyes of the observer, the actual and apparent brightness values of object points only need to be computed again, if the content of the scene or the position of the virtual observer window has changed. However, if the encoding of the holographic encoding values is adapted to a new position of the virtual observer window, defects of a tracking means and/or an imaging means as well as local characteristics of the optical light modulator being used for the encoding of the object points for the new position of the eyes of the observer might be considered.

Regarding the virtual observer window as mentioned above, which could also be called a virtual viewing window, it is noted, that there is no physical aperture or physical frame or other optical element involved. A virtual observer window according to the present invention rather is an area, where a three-dimensional scene to be reconstructed by the holographic system can be seen. Therefore, the eye of an observer is located at or near a virtual observer window.

In case the holographic system comprises a large virtual observer window, the computation of the actual and apparent brightness values for each object point can be carried out separately for the single directions of view within the virtual observer window. Usually, an observer window has the size of about 10 to 20 mm in diameter, if the viewing window has a circular shape. If the viewing window has a rectangular shape, the size of the virtual observer window usually is 10 to 20 mm length of an edge of the rectangular. However, if the virtual observer window has a larger size than the usual size, the large virtual observer window can be scanned in single angular segments. The computation of the holographic encoding values is carried out in such a case for every single angular segment. If it is necessary, in between values or interpolation values can be computed using known interpolation methods. Once the computation for every angular segment has been carried out, the encoding of the encoding values can be carried out separately. The maximal size of a virtual observer window is determined by the characteristics of the optical light modulator which comprises a maximal possible diffraction angle. Depending on the maximal size of the virtual observer window, the necessary increment results therefrom. The effective structural characteristic being responsible for the diffraction of the light interacting with the optical light modulator depends on the kind of encoding (e.g. Burkhardt-encoding, 2-phase-encoding) as well as from the type of the optical light modulator. A plurality of modulator cells or pixels of the optical light modulator are used for the encoding of amplitude and phase values of a complex encoding value. These pluralities of modulator cells then define the effective structural size of the optical light modulator and the diffraction in that regard. For example, the 2-phase-encoding is carried out such that phase values are encoded in two neighbouring pixels of an optical light modulator being embodied as a phase modulator. Those two encoded phase values then encode a complex encoding value. If optical light modulators are used which have no grid or regular diffraction structure, for example optical addressable spatial light modulators (OASLM), the smallest effective structure size depends on the writing for programming unit.

The method according to the present invention can also be applied for volumetric display devices. This is especially true, if the position of an observer observing a three-dimensional scene being displayed by the volumetric display is changed while tracking the actual position of the observer with a tracking means. With such a display device, it is not possible to encode different brightness values in different directions like this is possible with holographic system or holographic display devices, where one object point can be encoded with different diffraction patterns for different or single directions of views.

Because the diffraction pattern for a single object point can be generated for an object point within an area or within a limited region of the optical light modulator or with the complete area of the light modulator in a holographic system, another grid or diffraction pattern than the effective grid or diffraction pattern of the optical light modulator can be used.

The method according the present invention can be applied for example for the generation and the visualization and analysis of three-dimensional radio graphs (computer tomography, CRT) where the transparency and absorption characteristics of material, especially for biological material for x-rays is investigated and displayed for the purpose of diagnosis.

In a lot of applications, the three-dimensional scene is not only described by brightness values or intensity values, but the appearance of the three-dimensional scene is also depending on emission-, absorbtion- and/or reflection properties of single elements or objects within the three-dimensional scene.

In a preferred embodiment, in addition to the apparent brightness value, for each object point to be encoded an apparent colour value with which the object point is perceived at the virtual observer position is determined considering its actual colour value at its position and the transparency properties of all objects or object points which are situated between that visible object point and the virtual observer position. Each object point is encoded separately with its respective colour value such that it is reconstructed in the holographic system as far as possible at its real or virtual position with this colour value so that opaque and transparent object points can be perceived separately at their respective positions.

The method according this embodiment can be adapted to the applied colour model and the applied colour depth, in which the scene to be reconstructed can be encoded. A commonly used colour model is for example the additive red, green, blue model (RGB colour model) which can be adapted to this place very well. With this colour model, the colours are generated with a triple of one red, one green and one blue sub-pixel which emits or transmits light. The brightness value and the colour value of an object point are stored in three grey value channels, representing the colours red, green and blue respectively. The maximal possible number of grey values determines the possible colour depth.

The transparency characteristics of an object point usually is stored in a further channel, which is also called α-channel.

Other colour models use for example a colour value, colour saturation and a brightness value for each colour (hue, saturation and value, HSV model, or hue, saturation and brightness, HSB model). Furthermore, there exist also adapted colour models for specific display devices or formats, for example the YUV-model, being used for the television formats NTSC or PAL. Especially in the printing technology or light modulators working in a reflective mode, subtractive colour models are used. Examples therefore are cyan, magenta, yellow-model (CMY) or the cyan, magenta, yellow, key (CMYK), wherein key represent the black portion. Such models are suitable for the generation of hard-copy-holograms applying printing technologies.

Additional virtual object points are computed which might be virtually generated due to reflection, remission or scattering as a result of an interaction between light of at least one virtual or real light source and object points of the objects of the three-dimensional scene to be reconstructed. The spectral properties of the objects and virtual or real light sources can be considered. Apparent brightness values or apparent brightness and colour values at the virtual observer position are computed for those virtual object points like for real object points. They are encoded separately with their respective values.

Real light sources are light sources which apparently generate directed light in the three-dimensional scene to be reconstructed. Virtual light sources might be applied for example by reflection of light being generated by real light source at the surface of an object. Such virtual light sources can generate further virtual light sources, e.g. by multiple reflections which can be considered when applying the method for computing holographic encoding values as well. Such multiple reflections usually require a multiple stage process for the image syntheses.

In a preferred embodiment, the locations of the object points are corrected in relation to the virtual observer position—if necessary—due to optical properties such as reflection, refraction or diffraction at objects or object points which are situated between the virtual observer position and an object point to be corrected. The apparent brightness values or the apparent brightness and colour values are computed for those corrected positions. The object points can be encoded separately with the respective values.

This can apply to three-dimensional scenes which comprise objects having a reflective surface, such as mirrors, for complex objects, such as an aquarium, where the refraction law has to be applied to in order to visualize the correct location of an object in such an aquarium, e.g. a fish or a stone.

It is apparent for a person skilled in the art that a correction of the location of object points in relation to a virtual observer position can be carried out in three-dimensional scenes comprising no transparent objects. Therefore, the method according to the present invention could be modified in such a way as to neglect the method steps which relate to transparent objects which—in this particular case—are not present in the three-dimensional scene to be reconstructed.

The apparent brightness values or the apparent brightness and colour values of an object point at the virtual observer position are computed by considering the spatial transparency distributions of the objects or object points which are situated between that object point and the virtual observer position. Their spectral interdependencies can be taken into account.

Objects of a three-dimensional scene can comprise a unitary relative transparency value τ. This transparency value τ is the quotient from the transparency T and the thickness D of the material. The transparency of an object therefore depends on the lengths of the optical path along which light propagates in this object. In general, the transparency value τ of an object can be a function from the location (brightness function) or the function of the brightness and the colour (colour function). The transparency T can be computed by integration of the spatial dependency on the relative transparency value distribution τ along the optical path the light is propagating within the object. If an object comprises a spatial distribution of the refraction index, such an optical path can be non-linear.

In case a transparent object comprises scattering characteristics, for example a diffusing screen or a ground glass, only the light which passes directly through this scattering object determines the apparent brightness or the apparent brightness and apparent colour of the object points being located behind the most forward object point. Scattered light contributes to the apparent brightness of such an object. Such an object is also called a translucent object.

Preferably, the apparent brightness values or the apparent brightness and colour values of an object point at the virtual observer position are computed with the help of stochastic methods and the probabilities of absorption, scattering, reflection and diffraction of the transparent and/or reflecting and/or diffusing and/or diffracting and/or refracting objects or object points which are situated between that object point and the virtual observer position. Their spectral interdependencies can be taken into account.

This is especially helpful if further parts of the image synthesis are carried out with the help of stochastic methods, for example the Monte-Carlo-Method. Physical effects like for example absorption, reflection, diffraction or scattering, are not described by coefficients but by probabilities being derived from such physical effects when stochastic methods are applied. For example, the optical path of a plurality of single photons through a three-dimensional scene can be tracked or regarded. These photons can be generated by real light sources while considering the probabilities of emissions such photons. Random numbers can determine the emission characteristic of such a light source, for example the location where photons are emitted, the direction of emission of light, the wavelength and, if necessary, the polarization of the light being emitted and the phase relation of the emission of other photons or light waves, in case these parameters need to be considered. It can be decided at every optical interface with the help of equally distributed random numbers whether or not a photon is reflected, refracted, diffracted, scattered or absorbed. The uniformly distributed random numbers usually are scaled in an interval between 0 and 1. Such a decision can be made based on probabilities regarding absorption, transmission, scattering, reflection and/or diffraction probabilities, wherein the dependencies from physical parameters like the wavelength or the polarization can be considered. Effects of polarization occuring in connection with birefringent materials or a wavelength dependent transparency distribution of materials can be considered for example. All photons, which are directly generated from an object point by emission or photons which are sent via diffused reflection at the surface of an object towards the direction of the virtual observer window can be counted and this determines—after an appropriate scaling regarding the total amount of all generated photons—the actual brightness or the actual brightness and colour of an object point. The number of these photons arriving the virtual observer window is counted as well and this number determines after scaling the apparent brightness of this object point.

The grade of transmission or the transmittance T being the ratio of the intensity passing through a medium or in a simplified model a surface of an object and the incoming intensity can, for example, be interpreted as the transmission probability. When the incoming photon enters the medium or the object, a normalized random number Z is generated. If Z is smaller or equal T, then the photon passes through the medium or through the surface of the object. In case Z is greater than T, a photon is absorbed and does not contribute to the apparent brightness.

It is possible to apply more sophisticated models, where for example it is possible to consider reflections on surfaces of objects. If a photon incidences onto a surface or an optical interface, a new random number is generated and depending on this random number the probability of reflection R occurs or does not occur. In case reflection occurs, the photon alters according to the law of reflection its direction of propagation. In case of diffused or scattered reflection, the new direction of propagation of a photon can be determined with the help of a set of another random numbers. For example, the probabilities for deflection of a photon can be determined from the distribution of the reflection of an object. In case no reflection occurs, another random number being assigned to the probability of absorption of a photon can be determined and depending on this further random number, the photon is absorbed from the medium or the object, or the photon continues to propagate onto the exit interface of the object. At the exit interface of the object, it can be examined, if a reflection on the exit surface/optical interface occurs or if the photon passes through. Directed reflected light generates in such a case a virtual object point, whose position can be determined by back tracing of the reflection direction or considering the original direction of incidence. Only those virtual object points need to be considered from which photons can propagate to the virtual observer window, i.e. whose apparent brightness value is not 0 or whose location is not beyond the reconstruction volume. In case such a position is located outside the reconstruction volume, it is possible that virtual object points are generated within the area of the point of intersection of the extended rays through the border of the reconstruction volume to be reconstructed, which might, however, result in perspective distortions. Of course this is also possible for real object points being located outside the reconstruction volume. These object points are thereby projected or imaged to the background of the reconstruction volume. In case photons are refracted on their way, this result in an apparently different location of the corresponding object point. The new position of the object point can also be determined by a back tracing of the refracted beam or the path on which the photon propagated on. Usually, only the photons which are generated from an object point towards the direction of the virtual observer position by emission (transparent light source) or photons being reflected in a scattered way at a surface of a medium or object towards the direction of the virtual observer position are considered for the actual brightness of an object point. If no other objects or media are located between such an object point and the virtual observer position, the number of photons approaching the virtual observer position represents the apparent brightness of such an object point.

It is possible, that transparent object points can generate virtual object points in the same way as opaque object points.

The apparent brightness of transparent objects can also be influenced by scattering or diffraction of light at objects. These effects are considered preferably in an analogue way as this is done with the method according the present invention when considering transparent objects.

There might be cases, where the applications of such stochastical methods require a high computation time and a lot of computer memory, especially if a three-dimensional scene to be reconstructed comprises a high resolution and a lot of photons have to be computed. Such stochastical methods might therefore not be able to be carried out in real-time. However, even having complicated or complex scenes, simple algorithms can be applied and the computation of the photons can be carried out by parallel processing. Therefore, such methods can be especially applied if static scenes or holographic videos have to be carried out. The same is true for the generation of hard copies or for the generation of master therefore.

In a preferred embodiment, at least one transparency value of at least one single object which is situated between an object point and the virtual observer position is considered in an amplified or weakened form in the computation of the apparent brightness values or the apparent brightness and colour values of individual object points in order to improve or reduce the visibility of that point.

It is possible that areas or regions of a scene are reconstructed comprising a different apparent brightness and/or a different apparent colour compared to the natural appearance of this region or area of the scene. It is therefore possible, that the visibility of such areas can be amplified or weakened or suppressed and/or can be altered in their appearance. Therefore, algorithms can be implemented in the method according to the present invention which enables that areas of scenes which are to be altered or manipulated in their appearance to be temporarily stored (e.g. in computer memory), such that only the altered areas of the scene are changed without a complete re-computing of the scene. In case the method according the present invention applies sub-holograms for the computing of the holographic encoding values, as disclosed e.g. in WO 2006/066919 A1, only the sub-holograms of the object points of the respective areas of the scene before the manipulation can be subtracted when the summation of the sub-holograms is generated and the sub-holograms of the altered object points after the manipulation can be added onto the summation of the sub-holograms. The control of the manipulation could, for example, be carried out as a result of an interaction with at least one observer. The manipulation of the appearance of single areas of a three-dimensional scene to be reconstructed can be altered by altering e.g. the transparency characteristics of single objects or areas of scenes in order to highlight pathological areas within the visualization of organs within medical applications.

In a further aspect of the invention, the inventive method can be applied for computing the encoding values to be used in connection with a sound reproduction system. The sound reproduction system comprises at least two sound generating means and the sound reproduction system is used for the reconstruction of three-dimensional sound fields which comprise spatial and temporal varying sound values of the three-dimensional scenes. The three-dimensional scenes comprise objects with sound-absorbing properties. The reconstruction of the three-dimensional sound fields is made to be perceived for at least one listener ear. The method comprises the steps of:

h) The three-dimensional scene is divided into individual object points. The individual object points being capable of influencing the sound. The coordinates of these object points are determined.

i) A virtual listener position is determined which corresponds with the position of a selected listener ear where the three-dimensional scene is apparently perceived acoustically.

j) All object points are determined which are not fully covered by other fully sound-absorbing object points in the direction of the virtual listener position.

k) All object points which are located in the direction from the virtual listener position are sorted by their distance to the virtual listener position.

l) The actual loudness, pitch and sound transit time at the location of each object point being capable of influencing the sound is determined, if possible considering the location and intensity of all real and virtual acoustic sources of the scene at the position of those object points at the angle at which they are perceived from the virtual listener position, where the physical properties of the objects including the real and virtual acoustic sources can be taken into account.

m) For each object point being capable of influencing the sound the apparent loudness, pitch and sound transit time with which the sound is perceived at the virtual listener position is determined considering its actual loudness, pitch and sound transit time at the position of the object point being capable of influencing the sound, the distance to the virtual listener position and the absorption properties of all objects or object points which are situated between that object point and the virtual listener position.

n) Each sound value comprising this loudness, pitch and sound transit time is encoded separately such that its reconstruction with the sound reproduction system can be perceived at the location of the virtual listener position with this apparent loudness value, pitch and sound transit time.

Absorbing objects of the scene which are located between the sound sources and the listener ear decreases the loudness of the sound, resulting in a perception being quieter at the location of the ear of the observer than the sound source or acoustic source actual is. Sound reflecting surfaces or objects can generate additional virtual sound sources. Such sound being reflected can arrive later (i.e. under a different phase or different sound transit time or direction) compared to the sound of such a sound source arriving directly (i.e. without reflection) at the ear of the listener, thereby resulting in hall- or echo effects. This phase delay of the sound or the sound transit time is influenced by the velocity of sound in sound absorbing medium. Objects of the scene being capable of oscillation or vibration can be induced to oscillate/vibrate by incident sound, therefore resulting in virtual sound sources.

For a realistic perception of the sound, a separate computation and encoding of the portions sound for the left ear and for the right ear of an observer is carried out in a preferred embodiment according to the present invention.

The reconstruction of an encoded sound distribution for a three-dimensional scene can be carried out with the help of a field of individual sound generating means, wherein this field comprises a resolution being rather high, wherein the single sound generating means should be controllable regarding their phase relationship synchronously. Furthermore, the sound generating means should comprise a rather high frequency spectrum regarding the sound it can generate. The sound generating characteristics of each or at least one sound generating means can be considered separately as well as the acoustic characteristics of the sound reproduction system and the volume, in which the sound is generated, when the computing of the encoding values for the sound generating means is carried out.

It is therefore especially preferred to combine the computing and encoding and reconstructing of a three-dimensional scene with regard to the optical perception, i.e. the apparent brightness or the apparent brightness and colour values of the three-dimensional scene, as this is described for example in claims 1 to 7. In addition to that, the reconstruction of the sound of such a three-dimensional scene is computed, encoded and/or reconstructed at the same time. In other words, the virtual loudness, pitch and sound transit time is computed and encoded according to claim 8 in addition to computing and encoding the apparent brightness or apparent brightness and colour values according to one of the claims 1 to 7.

A holographic system, e.g. a holographic projector device, and a field or arrangement of sound generating means is used. For example it is possible to generate a virtual scene in a volume in which an observer can move. The reconstruction is tracked according to his movement within this volume or the scene is computed and reconstructed for the whole moving space of the observer so that the observer can see and hear the three-dimensional reconstructed scene from every position within this volume realistically.

The method according to the present invention is not only limited to ray-tracing or computations of rays when the actual or apparent brightness values or the actual or apparent colour values and/or the actual or apparent loudness values, pitch and sound transit times are determined. The analysis for carrying out this method can also comprise methods considering the wave character of light or the finite element method (FEM). The method of finite element method can advantageously be applied for example with the simulation of three-dimensional physical processes, for example temperature distributions or distributions of mechanical tension or mechanical stress, wherein the reconstruction of three-dimensional distribution is carried out in false colour visualization.

In order to carry out the method according to one of the claims 1 to 9, a computing unit can be adapted to carry out the single method steps in an optimal way. Therefore, according to the present invention, a computing unit for computing the encoding values for an optical light modulator (SLM) and/or for a sound generating means of a holographic system and/or a sound reproduction system, respectively, for the reconstruction of three-dimensional scenes is provided. The three-dimensional scene includes objects with transparent optical properties and/or with sound absorbing properties and is reconstructed for at least one observer eye and/or for at least one listener ear. The computing unit carries out the method of at least one of the claims 1 to 9.

Such a computing unit could comprise at least one programmable processor core and/or at least one programmable logic device (PLD) of a any type and/or at least one application-specific integrated circuit (ASIC) and/or at least one digital signal processor (DSP). At least two of these devices can be combined in one integrated circuit.

The computing unit can comprise further components, like for example means for storing program code and/or data, a power supply, means for controlling and visualization of operating states and/or computation results.

This computing unit can be part of a system controller of a display for the reconstruction of three-dimensional scenes, for example a holographic display, a holographic 3D-TV-device, a 3D-gaming-device, a mobile device for the visualization/reconstruction of holographic data and/or a device for reconstructing three-dimension sound distributions/sound fields. The computing unit can be provided as a separate unit being connected between an electronic computing device or another device for receiving and/or for generating and/or for storing of 3D scenes and a holographic display device and/or a system for playing back three-dimensional sound fields.

This computing unit can be a part of a general computing system which can be used for the computation of three-dimensional scenes.

The computing unit can comprise parts of different technologies, for example a computing unit which is operated with optical methods (for example a quantum computer and a computer unit being based on calculations being performed electronically). It is especially advantages, if such a computing unit comprises a high number of calculation units which can be operated a means of parallel processing.

BRIEF DESCRIPTION OF THE DRAWINGS

For a complete understanding of the objects, techniques, and structure of the invention reference should be made to the following detailed description and accompanying drawings, wherein:

FIG. 1 (*b*) shows the principle of conventional holography.

FIG. 2(*b*) shows a generated viewing-zone by using Sub-Holograms.

FIG. 6(*b*) is a figure for explaining the reconstruction of multiple 3D scene-points at the same position in the hologram-plane but having different depths by using multiple content data layers.

DETAILED DESCRIPTION OF THE INVENTION

Figure 12:
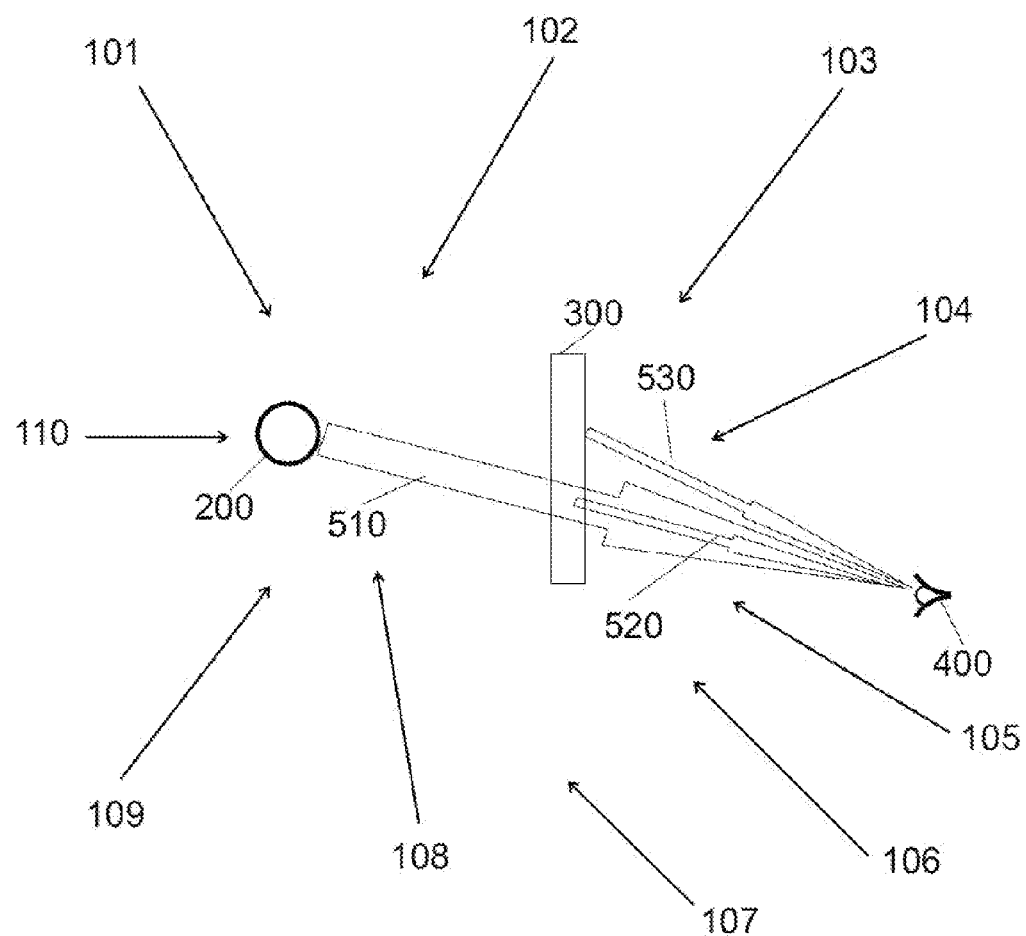
FIG. 12 shows a schematic presentation of a simple three-dimensional scene comprising an opaque and transparent object.

A view of a simple three-dimensional scene comprising an opaque and a transparent object is shown in a schematic presentation in FIG. 12. The three-dimensional scene which has to be reconstructed with a holographic system or a holographic display device (not shown) comprises an opaque object 200 and a transparent object 300. The two objects 200 and 300 can be divided into a plurality of individual object points (not shown in FIG. 12). A diffuse white light source (not shown) illuminates the three-dimensional scene uniformly from all directions. Light rays 101 to 110 of the light source are shown schematically in FIG. 12. The three-dimensional scene is reconstructed for an eye 400 of an observer. The location within the scene, from which the eye 400 of the observer apparently perceives the three-dimensional scene is determined to be the virtual observer position, also denoted with reference numeral 400. Object points being located on the averted side of the object 200 relative to the virtual observer position 400 (i.e. being the backside of the object 200 as seen from the virtual observer position 400) do not contribute to the visualization of the object 200 and therefore do not need to be computed or encoded. This simple scene as shown in FIG. 12 does not comprise objects having reflective surfaces and this scene also does not comprise light sources having directional light emission characteristics. Therefore, no virtual objects or virtual light sources occur in the scene. Because of the diffuse illumination of the three-dimensional scene with white light, the objects 200, 300 are perceived by the observer being located at their actual position and according to their colour values which are associated with the material characteristics of the objects 200, 300. Object 200 comprises in the example of FIG. 12 a yellow colour. The blue portion of the light intensity of the white light is absorbed by the object 200. Red and green light of the white light is remitted completely in all directions. The visible object point of the opaque object 200 would be perceived at the virtual observer position 400 with its actual intensity 510 being $IAo = IAo\_r + IAo\_gr$ in yellow colour, if the transparent object 300 would not be present in the three-dimensional scene. $IAo\_r$ and $IAo\_gr$ are the apparent intensities or actual colour values of the directed light coming from an object point of the opaque object 200 to the virtual observer position 400. The intensity portion or colour value for the blue colour $IAo\_b$ is equal to 0. The absolute value of the actual intensity is also determined from the brightness of the diffuse illumination. The transparent object 300 being present in the three-dimensional scene of FIG. 12 comprises for red and blue light a transparency of $Tr=0.5$ and $Tb=0.5$, respectively. The intensity portion of green light is completely absorbed by the transparent object 300, i.e. the transparency for green light is $Tgr=0.50\%$ of blue light and 50% of red light is absorbed by the transparent object 300, and 50% of the blue light and red light is transmitted. The apparent intensity $ISo$ 520, under which an object point of the opaque object 200 at the location of the virtual observer position 400 is perceived is therefore: $ISo = Tr*IAo\_r + Tgr*IAo\_gr + Tb*IAo\_b = 0.5*IAo\_r$. In the example of FIG. 12 an observed object point of the opaque object 200 is perceived at the virtual position 400 in red colour with the half intensity of the red intensity portion. Such an object point is computed and encoded with this intensity value during the holographic reconstruction of the three-dimensional scene.

The object points of the transparent object 300 comprise a violet colour as seen from the direction of the virtual observer position 400. The actual intensity $IAt$ 530 can be calculated using the three intensity portions $Ir$, $Igr$ and $Ib$ of the red, green and blue light of the diffused white light source to: $IAt = 0.5*Ir + 0.0*Igr + 0.5*Ib$. No further transparent objects are located between the transparent object 300 and the virtual observer position 400 ($IAt=ISt$). Therefore, the actual brightness of the transparent object 300 is also the apparent brightness. The object points of the transparent object 300 are computed and encoded using these brightness values while reconstructing the three-dimensional scene. In this simple example according to FIG. 12, no reflections on the optical interfaces of the objects have been considered. Furthermore, a variation of the transparency depending on the optical path within a medium has been neglected.

It is noted that opaque object points also influence the actual and apparent brightness and/or actual and apparent colour of transparent object points which are located towards the direction of the virtual observer position, because such opaque objects can shield or cover light of light sources in the scene.

The more exact physical effects can be considered while carrying out the image syntheses, the more realistic views of the three-dimensional scene can be generated.

Especially in order to enable a three-dimensional perception of the three-dimensional scene to be reconstructed, different views for all eyes of observers are generated. In case reconstructed holograms being viewed under a large viewing angle at the same time, for example hard copies, a plurality of such views for different virtual observer positions are computed, wherein it is possible to interpolate views for intermediate positions from views of adjacent views. In doing so, it is possible that the content of the 3D dimensional scene can be altered with the virtual observer position (multiple hologram). The computation of the single views can be performed in a sequential and/or preferable in a parallel manner. The virtual observer positions for the single eyes of observers can be adapted to the movements of an observer, in case the observer position changes.

Because the visible object points of the opaque object 200 and the transparent object 300 are encoded separately, it is possible, that an observer can focus with his eyes onto each single object 200, 300 individually and therefore observe a reconstructed three-dimensional scene with almost no eyestrain, because there is no mismatch between convergence and accommodation of the eyes when looking at an object of the three-dimensional scene. Therefore it is possible, that an observer can observe the reconstructed three-dimensional scene with his natural eye movement without distortions.

While carrying out the computations of the three-dimensional scenes according to the present invention, well-known program libraries can be used for the computing of such scenes. Such program libraries are, for example, OpenGL, Direct3D or the XNA-Framework. It is possible to use a known mathematical method, for example to access precomputed values of a look-up-table (LUT) or the interpolation of intermediate values.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the scope of the appended claims.

APPENDIX

The following disclosure is provided for disclosing further information regarding to the present invention mentioned above. It is emphasized that—even though information might be provided only in the appendix and not in the description above—the appendix constitutes a part of the present application.

Generation, Encoding, and Presentation of Content on Holographic Displays in Real Time It is discussed a solution for driving holographic displays with interactive or video content encoded in real-time by using SeeReal's Sub-Hologram-technology in combination with off-the-shelf-hardware. Guidelines for correctly creating complex content including aspects regarding transparency in holograms from both the content side and the holography side are presented. The conventional approaches for generating computer generated holograms are discussed in comparison with our solution using Sub-Holograms, to rapidly reduce computation power. Finally the computing-platform and the specification of our 20 inch direct-view holographic prototype will be presented.

1. Introduction

The conventional approaches to generate CGHs (computer generated holograms) are not well suited for interactive applications because of their massive consumption of computing power. So by using them, just still images or pre-calculated videos have been implemented. To realize the key benefits of 3D-holography, as compared to 3D-stereo, interactive content is essential—this provides a roadmap for combining typical 3D-applications as professional design, 3D-gaming or 3D-TV with the viewing comfort of 3D-holography. Accordingly, solutions for real-time holographic calculation without the need for high performance computing hardware are required.

This paper will present some background to create appealing interactive holographic applications. Furthermore the adaption of our novel Sub-hologram technology to effectively make use of graphics processing units or field programmable gate arrays will be discussed, which enables the calculation of holograms in real-time.

2. Real-Time Holography

This chapter gives an overview about holography and especially compares the conventional approach against the novel Sub-Hologram technology from SeeReal, which is the basis to calculate large holograms in real-time.

2.1 Why Holography?

Holography in comparison to 3D-stereo overcomes the problem of the depth-cue mismatch between depth-focus and convergence. This so called accommodation-convergence mismatch leads to fatigue or headache, even a short loss of orientation may occur, so with 3D-stereo, only small depth-ranges must be realized and the time to consume 3D-stereo without a break should also be very limited.

Holography in contrast is like natural 3D-viewing, which allows very large depth ranges, there are no negative effects, because the eyes can both focus and converge on the object seen. When looking at a hologram, the object focused looks sharp while other objects in different distances will look blurry like it is in real life. In 3D-stereo the eyes converge on the object but focus on the display itself—a mismatch occurs, which leads to the effects already described above (see FIG. 1a).

This is the reason, why holography will be the next big step in the currently rapid developing market for 3D-stereo, because it is the better option to many fields of applications, i.e. professional 3D-design, 3D-gaming and 3D-television.

The next section compares the conventional approach to create holograms with SeeReal's novel solution, the so called Sub-Holograms. The use of Sub-Holograms enables to calculate large and deep holograms in real-time, which allows realizing interactive content on holographic displays using off-the-shelf hardware components.

Figure 1:
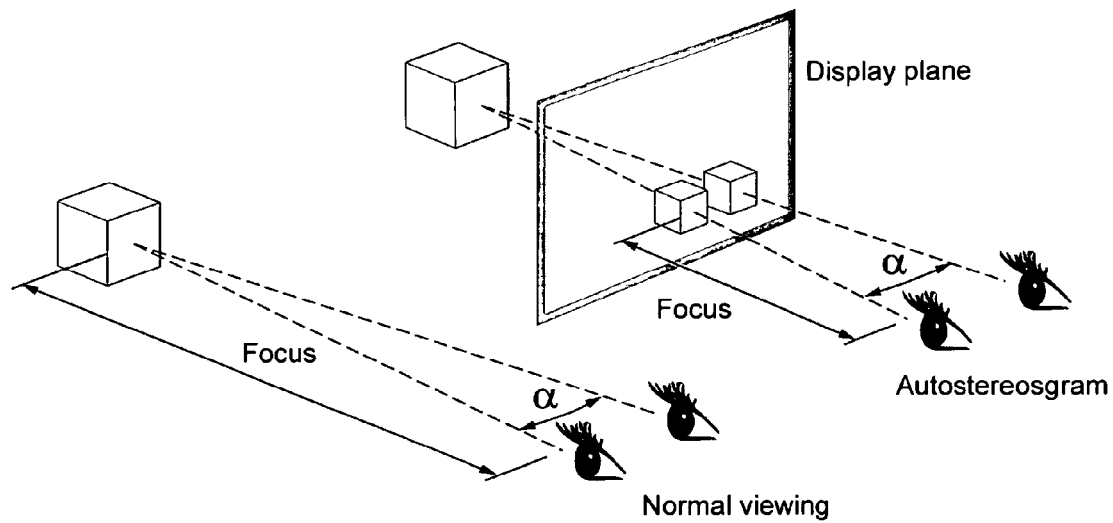
FIG. 1(*a*) shows the difference between 3D-stereo and natural viewing/holography.
Figure 1:
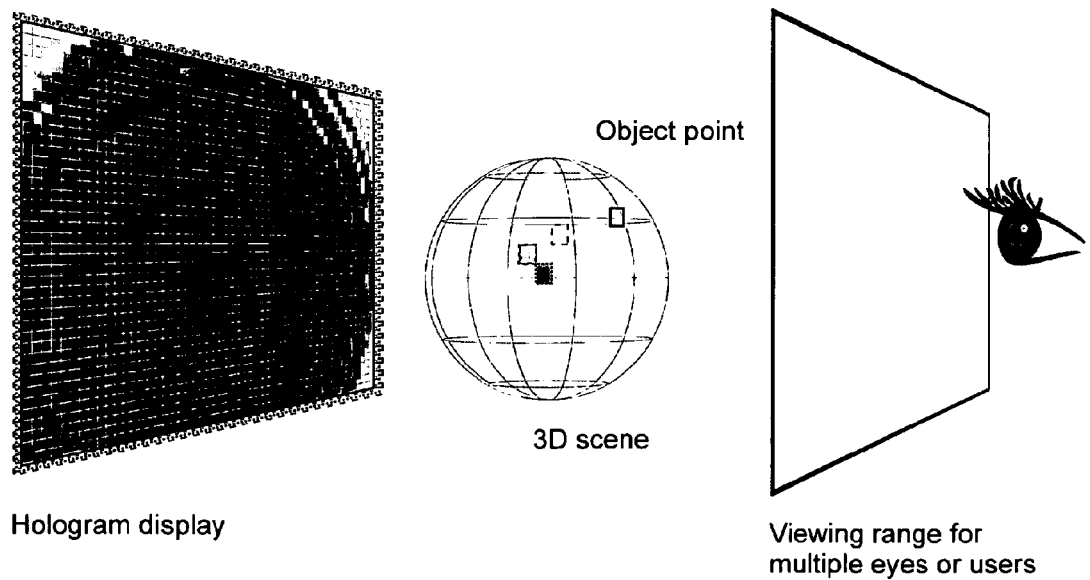

Reference is made to FIG. 1, which shows in FIG. 1 (a) the difference between 3D-stereo and natural viewing/holography: for 3D-stereo both eyes converge at the object in depth but focus on the display plane, for natural viewing and holography both focus and convergence are the same. FIG. 1 (b) shows the principle of conventional holography: Multiple large overlapping diffraction patterns reconstruct multiple scene-points, when illuminated by a coherent light source—the reconstruction can be seen in a defined viewing-zone.

2.2 The Conventional Approach versus Sub-Holograms

A hologram is in general a complex diffraction pattern. When illuminated by a coherent light-source, a 3D-scene consisting of scene-points is reconstructed, which is viewable at a defined area in space (see FIG. 1b).

The conventional approach to calculate computer generated holograms (CGHs) is generally based on the following scheme: Each pixel in a hologram contributes to each reconstructed scene point. That means, for each scene-point of a scene, a diffraction-pattern with the size of the full hologram has to be calculated. These individual holograms are all added up together—by complex superposition—to create the hologram representing the complete scene.

Figure 2:
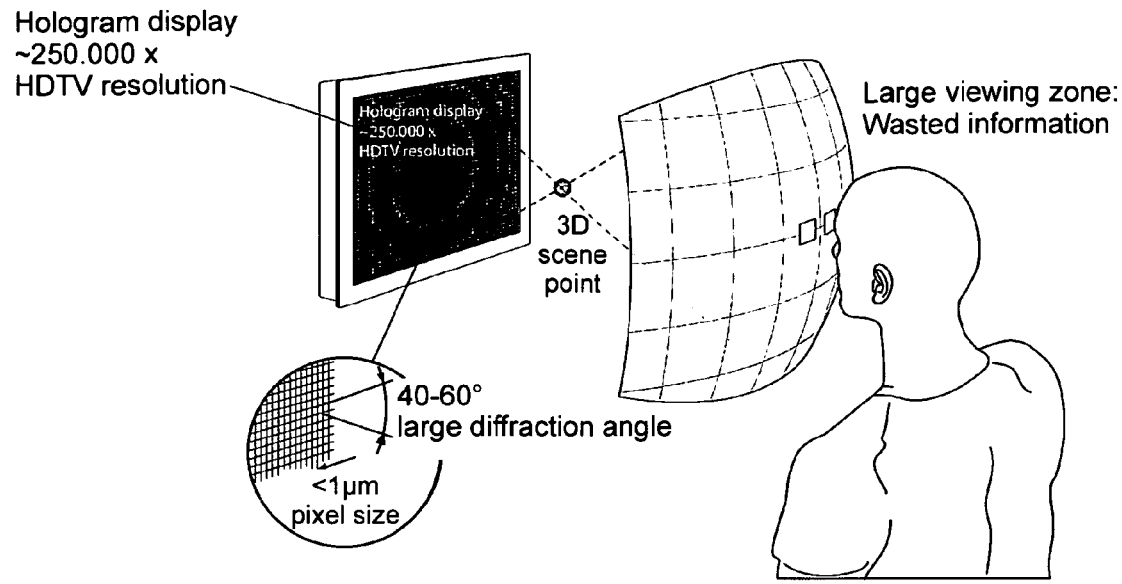
FIG. 2(*a*) shows a generated large viewing-zone by using the conventional approach.
Figure 2:
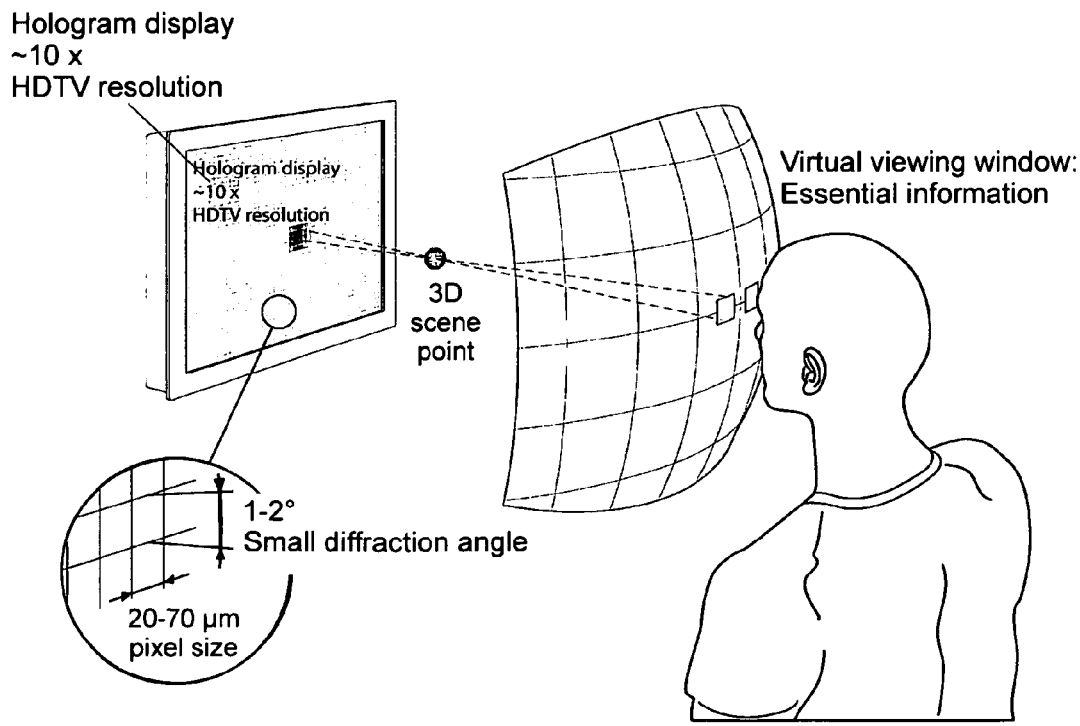

Reference is made to FIG. 2, which shows in FIG. 2 (a): When using the conventional approach, a large viewing-zone is generated, but only a small portion is really needed at the location of the observer's eyes—so most of the calculated information is wasted. FIG. 2 (b) shows: Only the essential information is calculated when using Sub-Holograms. In addition the resolution of the holographic display is much lower and well within today's manufacturing capabilities.

These conventional holograms provide a very large viewing-zone on the one hand, but need a very small pixel-pitch (i.e. around 1 μm) to be reconstructed on the other hand (see FIG. 2a). The viewing-zone's size is directly defined by the pixel-pitch because of the basic principle of holography, the interference of diffracted light. When the viewing-zone is large enough, both eyes automatically sense different perspectives, so they can focus and converge at the same point, even multiple users can independently look at the reconstruction of the 3D scene.

In a conventional hologram, the amount of pixels to calculate for each scene-point is immense. Beside the lack of a display-technology providing a small pitch at useful display-sizes, it would need incredible computing power. In addition the handling of such large amounts of data leads to even more problems regarding data transfer rate, memory and so on. This is a key reason why real-time holography using the conventional approach does not seem commercially viable in the foreseeable future. Because these of technical limits, only stills like hardcopys or chemical films could be realized in sizes appropriate for desktop or TV-like applications and with scalable technologies until now.

When looking at FIG. 2b, it can be seen that most of the calculated information in a conventional hologram is wasted, because only the information the eyes can actually see is really needed. So instead of calculating the full viewing-zone, just that part of the hologram needs to be calculated, which is responsible for reconstructing a specific 3D scene point at the observer's eyes location—a Sub-Hologram (SH). This reduced viewing-zone is the so called Viewing-Window (VW) (see FIG. 3).

The reduction of the size of this viewing-zone is done by increasing the pixel-pitch—the pixel-pitch along with other parameters defines the size of the viewing-zone. By overlapping (adding or super-positioning) the SHs of different scene-points, a holographic 3D scene with dense scene-points is reconstructed and visible at the location of the VW (see FIG. 3).

The increased pixel-pitch on the other hand leads to a dramatically reduced pixel-count allowing the use of current display-technologies as another motivation. But the use of a small VW also implies the need of a fast, reliable and very precise Eye-Tracking system to shift the VW according to the observers' eye-movements. Such Eye-Tracking systems have already been developed, but currently SeeReal's uses its own Eye-Tracking solution integrated into holographic prototypes, which already have been demonstrated by See-Real at public events like SID, FPD Yokohama and Finetec.

Figure 3:
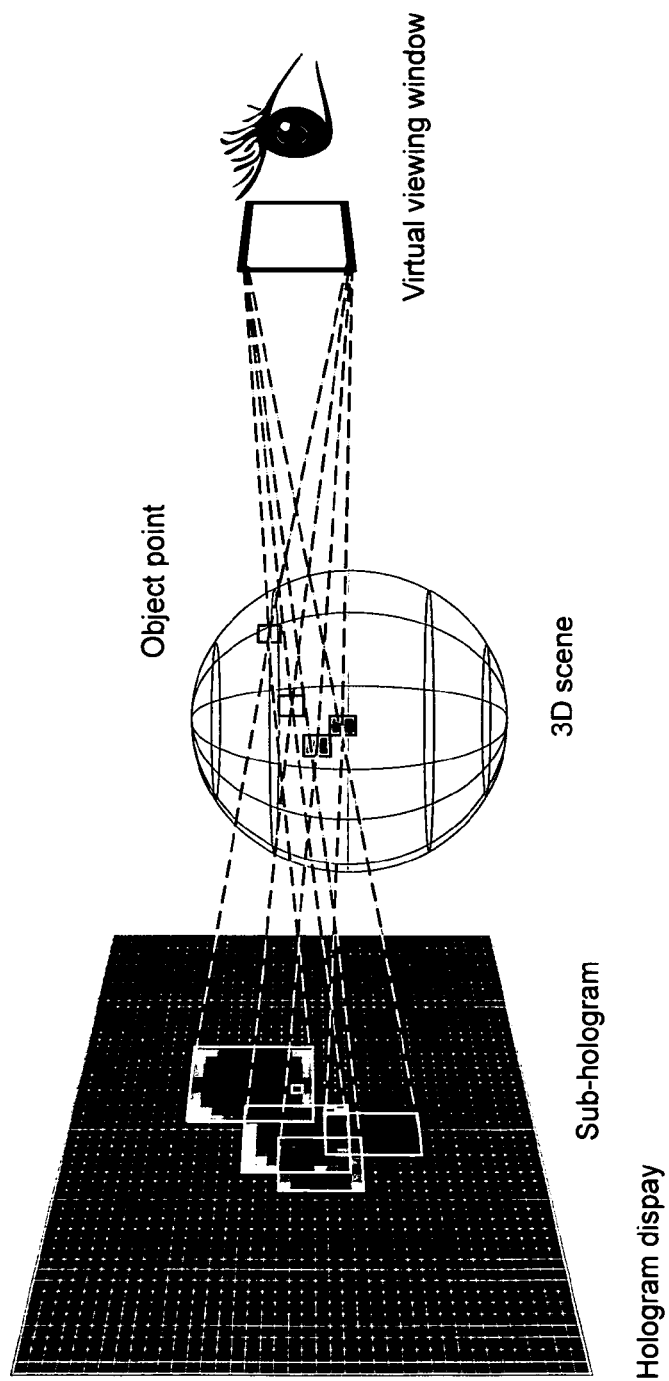
FIG. 3 shows a Viewing-Window as a reduced viewing-zone by using Sub-Holograms.

Reference is made to FIG. 3, which shows only a small part of the hologram—a Sub-Hologram—is needed to reconstruct one single scene-point in the reduced viewing-zone—the Viewing-Window. By super-positioning multiple Sub-Holograms, a hologram representing the whole scene is generated and reconstructed at the Viewing-Window's location in space.

To give an example how enormous the savings of computing power are, both approaches have been compared in general using an exemplary situation.

Assuming to have a 40 inch SLM (800 mm×600 mm), one observer is looking at the display from 2 meters distance, the viewing-zone will be +/−10° in horizontal and vertical direction, the content is placed inside the range of 1 m in front and unlimited distance behind the hologram, the hologram reconstructs a scene with HDTV-resolution (1920× 1080 scene-points) and the wavelength is 500 nm, then the situation specified in has to be managed.

Here for the conventional approach the calculation is based on Fourier-transforms[1] to apply the most efficient method for such large holograms, for this is assumed to have a depth quantization for the scene-points of 256 steps. For the SH-approach it is required to calculate two independent holograms, one for each eye.

At the bottom line, both approaches provide the same result for an individual observer position, but the significant difference in regards to resolution of the light modulator, frame-size and computing power can be clearly seen.

To further reduce the computation power, so called single-parallax holograms can be used, where the size of a SH and holographic parallax is reduced to one dimension. This is possible for vertical or horizontal direction—so called horizontal-parallax-only (HPO) or vertical-parallax-only (VPO) holograms[3]. By mixing half-parallax SHs with different views for each eye, for example a vertical holographic parallax, with a horizontal stereo-parallax, a real-time video-hologram with low computational needs can be created[8]. The perceived limitations of single-parallax reconstructions are not visible to an observer if well understood and incorporated into holographic content.

TABLE 1

Comparison between the conventional and Sub-Hologram approach.

| | Conventional Hologram | Hologram based on full-parallax Sub-Holograms and tracked Viewing-Windows |
|---|---|---|
| SLM pixel-pitch | 1.4 μm | 100 μm |
| Viewing-Window/Viewing-zone | 700 mm × 700 mm/700 mm × 700 mm | 10 mm × 10 mm/>700 mm × 700 mm |
| Depth Quantisation | 256 steps | ∞ |
| Hologram-resolution in pixels | ~572K × 429K ≈ 246 GPixel | 8000 × 6000 ≈ 48 MPixel |
| Memory for one hologram-frame (2 × 4 byte per hologram-pixel) | 1968 GByte | 2 × 384 MByte (two holograms, one for each eye) |
| Float-operations for one monochrome frame | ~33 PetaFlops (by using an optimized FFT-based calculation) | 2 × 182 GigaFlops (by using the direct Sub-Hologram calculation) |

But even holograms providing full parallax SHs can be handled with SeeReal's algorithms using today's state-of-the-art technologies like field programmable gate arrays (FPGAs) and graphics processing units (GPUs), which provide sufficient computing power. This is being discussed in the following sections.

3. Seereal'S Holographic Processing Pipeline

The next four sections provide an overview of the important steps to showing real-time 3D-content on a holographic 3D display by using Sub-Holograms as explained above.

Figure 4:
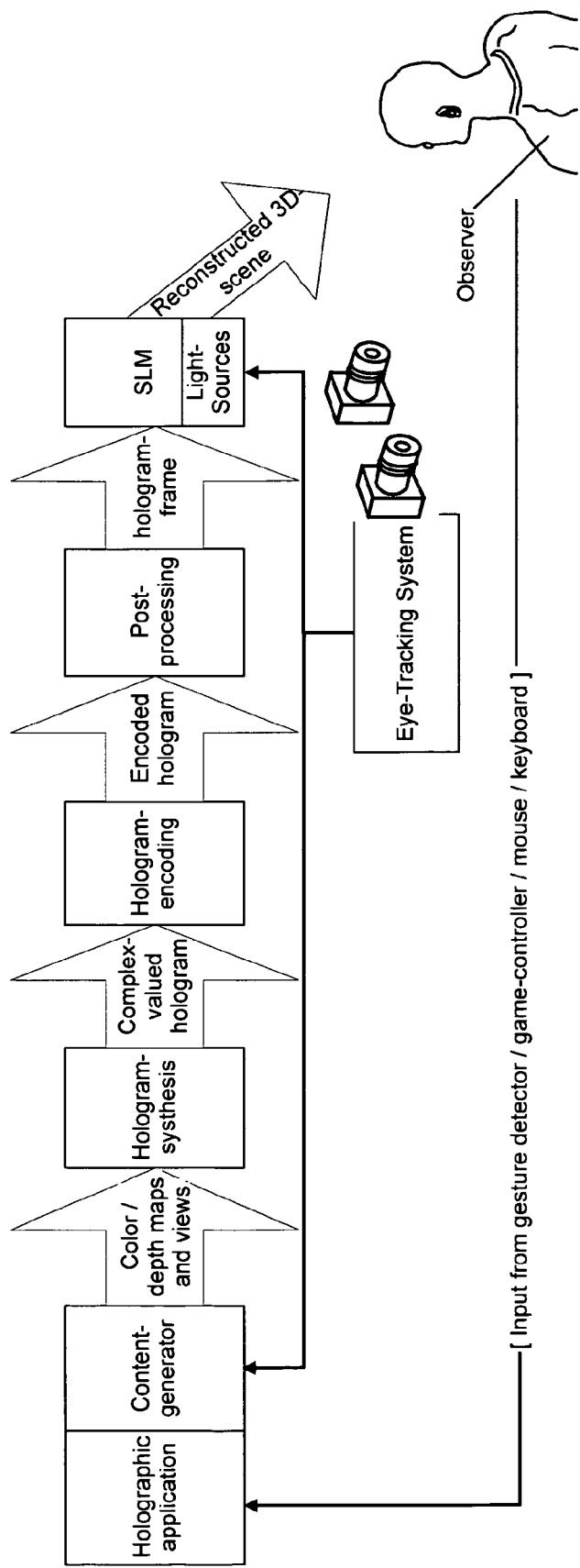
FIG. 4 shows a general overview of our holographic processing pipeline.

Reference is made to FIG. 4, which shows a general overview of our holographic processing pipeline. The steps shown in FIG. 4 define our holographic software pipeline, which is separated into the following modules: Beginning with the content creation, the data generated by the content-generator will be handed over to the hologram-synthesis, where the complex-valued hologram is calculated. Then the hologram-encoding converts the complex-valued hologram into the representation compatible to the used spatial light modulator (SLM), the holographic display. Finally the post-processor mixes the different holograms for the three color-components and two or more views dependent on the type of display, so that at the end the resulting frame can be presented on the SLM.

4. Step I: Content-Generation

For holographic displays, two main types of content can be differentiated. At first there is real-time computer-generated (CG) 3D-content like 3D-games and 3D-applications. Secondly there is real-life or life action video-content, which can be live-video from a 3D-camera, 3D-TV broadcast channels, 3D-video files, BluRay or other media.

For most real-time CG-content like 3D-games or 3D-applications, current 3D-rendering APIs utilizing graphics processing units (GPUs) are convenient. The most important ones are Microsoft's Direct 3D and the OpenGL-API.

When creating and rendering a scene, for each view a 2D-map (a texture in terms of 3D-rendering API's) with pixels is created, where each pixel provides color along with its 2D-position. Each pixel can also be seen as a scene-point of the corresponding 3D-scene. This is the reason why both APIs are in general very suitable to generate content to be processed by SeeReal's holographic processing pipeline.

4.1 Views, Color and Depth-Information

In SeeReal's approach, for each observer two views are created, one for each eye. The difference to 3D-stereo is the additional need of exact depth-information for each view—usually supplied in a so-called depth-map or z-map bound to the color-map. The two views for each observer are essential to provide the appropriate perspective view each eye expects to see. Together they provide the convergence-information. The depth information provided with each view's depth-map is used to reconstruct a scene-point at the proper depth, so that each 3D scene-point will be created at the exact position in space, thus providing a user's eye with the correct focus-information of a natural 3D scene. The views are reconstructed independently and according to user position and 3D scene inside different VWs, which in turn are placed at the eye-locations of each observer.

The provided depth-information hast to be very precise because the depth of a scene-point given in the depth-map and its depth information provided by the parallax of the two views must correlate. This is essential to reconstruct a scene point at the right place in the viewing volume of the holographic display, so that focus and convergence will match. The depth-information is later used to create the correct diffraction pattern, the Sub-Hologram, which allows the eye to focus exactly at the convergence point.

4.2 Virtual Cameras

Another important point which also applies to 3D-stereo, but is often underestimated by content creators, is the correct 3D-camera-setup (real cameras or virtual cameras for real-time 3D-content) from which the views for both eyes are taken.

Figure 5:
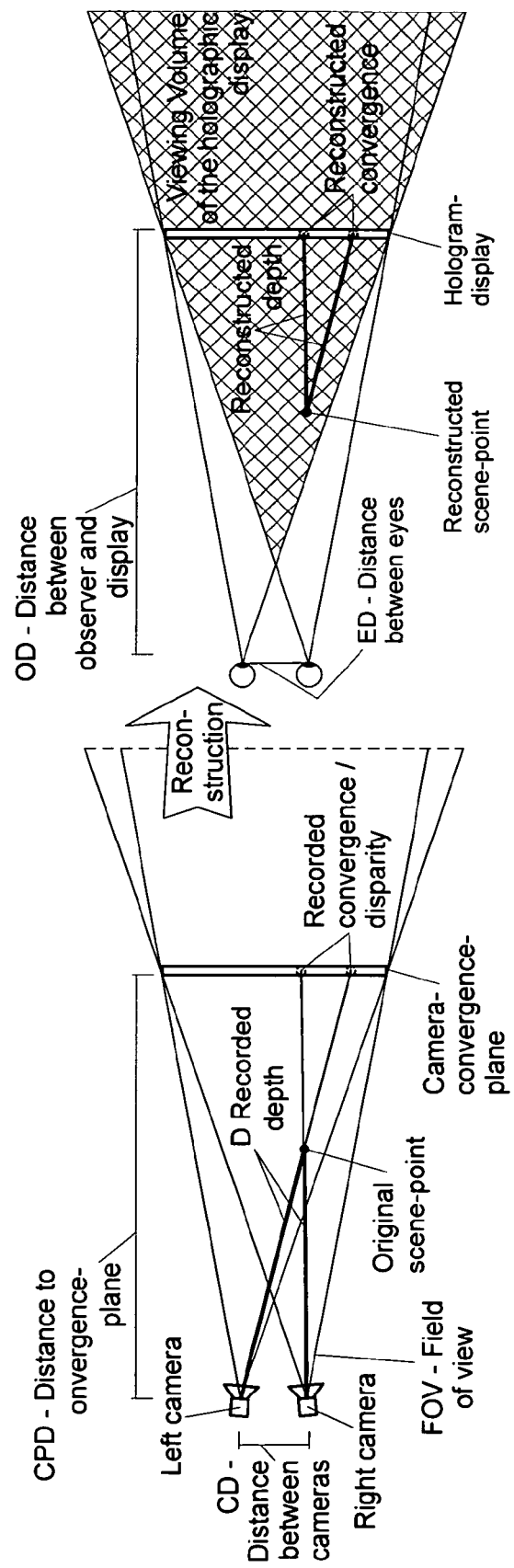
FIG. 5 shows a schematic view of a camera-setup and the resulting reconstruction.

Reference is made to FIG. 5, which shows a schematic view of a camera-setup and the resulting reconstruction. If both FOV (field of view) and the relation between CD (camera distance) and CPD (convergence-plane distance) are nearly equal to the setup ED/OD (eye distance/observer distance), the holographic display provides, a 1:1 reconstruction can be achieved.

The (virtual) cameras, from where the convergence-information is recorded, should ideally have the same setup as the observers are sensing with their eyes. That means the cameras should be positioned at the locations of the eyes with convergence at the display-plane. Then an original scene could be recorded and would be 1:1 reconstructed. In general, the relation between the parameters for the camera-setup should be nearly the same as the setup the holographic display provides—CD/CPD should be nearly ED/OD (see FIG. 5). The camera's field of view should provide nearly the same angular region, which is spanned from the display-plane to the observer's eye. Only by taking these restrictions into account, a scene can be reconstructed and seen "as it would be really there". Otherwise the scene would look similar, but with slight modified perspective or size, dependent on which parameters are not ideal. If the parameters are too different from the proper geometry, a strong perspective mismatch may occur.

These restrictions can be considered easily for real-time computer-generated 3D-content, because there the virtual cameras can be placed and modeled freely in the virtual space. Such virtual cameras are typically represented by so called view- and projection-matrices in terms of 3D-rendering APIs. For real-world (3D-camera) or offline computer-generated content (i.e. computer animated movies), the above mentioned restrictions should be kept in mind, because once the images are taken, the camera-setup could not be changed afterwards. A compromise could be the automatic generation of all required views from one central perspective, containing color and depth-information, from which all other perspectives are generated[10]. But there a loss of quality has to be taken into account, mainly because of missing occlusion-information. Since only one perspective is available, important perspective information, objects are occluding in the central view, is not available in other perspectives. Nonetheless, embodiments are possible to include occlusion data as part of the data stream.

For real-time computer-generated 3D-content, the actual observer-position in front of a holographic display with user tracking can be used for proper positioning of the virtual cameras. In SeeReal's holographic 3D displays with information only within viewing windows, knowledge of eye coordinates can also be used for positioning the virtual cameras corresponding to position and movement of the observers, such providing the full viewing range ("look around" effect) of a natural scene. That means, the scene seems to be fixed at the same place, like in nature, when looking around a stationary object. In addition to providing all natural depth cues for comfortable long-time 3D viewing, this creates the same large viewing-zone, a conventional ultra high resolution hologram would inherently provide. Furthermore this feature is used to properly set the distance of the virtual cameras according to the observer's eye-distances to perfect the virtual camera-setup. The look-around effect is a voluntary (switch on/off) feature though, which will not be desirable for all 3D content.

4.3 Transparency

An interesting effect, which is a unique feature of See-Real's holographic processing pipeline, is the reconstruction of scenes including (semi-) transparent objects. Transparent objects in the nature, like glass or smoke, influence the light coming from a light-source regarding intensity, direction or wavelength. In nature, eyes can focus both on the transparent object or the objects behind, which may also be transparent objects in their parts.

Such a reconstruction can be achieved using SeeReal's solution to holography and has been realized in display demonstrators the following way: Multiple scene-points placed in different depths along one eye-display-ray can be reconstructed simultaneously. This means super-positioning multiple SHs for 3D scene points with different depths and colors at the same location in the hologram and allowing the eye to focus on the different scene-points at their individual depths (see FIG. 6a). The scene-point in focal distance to the observer's eye will look sharp, while the others behind or in front will be blurred. Unfortunately a reconstructed 3D scene point cannot realize the physical behavior a transparent object in nature will perform with passing light waves. So this behavior has to be simulated by manipulating the colors of the scene-points accordingly to realize effects like color-filtering or damping.

From the side of content-creation this transparency-effect can be controlled by adding an alpha-value to each scene-point, beside the existing color and depth-value. If a scene-point has an alpha-value of 0.0 (totally transparent) it will not be reconstructed, no SH will be created. An alpha-value of 1.0 means the scene-point is totally opaque, for this a single SH will be created—all scene-points behind will not be visible and no SH will be created for them. A value between 0.0 and 1.0 means the scene-point is partly-transparent, while the alpha-value represents its grade of transparency, so for both the transparent scene-point and the ones behind or in front, Sub-Holograms will be created.

Current real-time 3D-Rendering APIs like Direct 3D and OpenGL provide only one depth-value per pixel, because only one color map and one depth-map is typically used at the same time to store a rendered scene. When rendering transparency-effects, typically multiple passes are done by blending all transparent objects in their depth order against the others already rendered into the color-map. For these blending-passes, the generation of depth-values is typically discarded. The final depth-value of each pixel in the depth-map normally corresponds to the pixel behind all transparent objects. Therefore a solution was developed by SeeReal to use these state-of-the-art 3D-Rendering API's on one hand and create depth-values for all transparent objects on the other hand.

SeeReal's principle of generating multiple 3D scene-points at the same position in the hologram-plane but with different depths is based on the use of multiple content data layers (see FIG. 6b). Each layer contains scene-points with individual color, depth and alpha-information. These layers can be seen as ordered depth-layers, where each layer contains one or more objects with or without transparency. The required total number of layers corresponds to the maximal number of overlapping transparent 3D scene points in a 3D scene. This scheme is compatible with the approach to creating transparency-effects for 2D and stereoscopic 3D displays. The difference on one hand is to direct the results of the blending passes to the appropriate layer's color-map instead of overwriting the existing color. On the other hand, the generated depth-values are stored in the layer's depth-map instead of discarding them.

Figure 6:
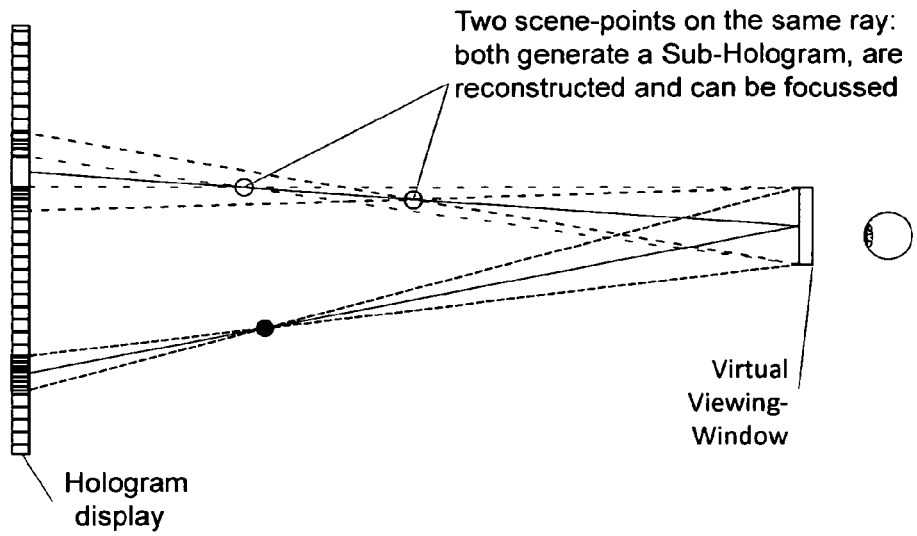
FIG. 6(*a*) is a figure for explaining the reconstruction of multiple scene-points placed in different depths along one eye-display-ray.
Figure 6:
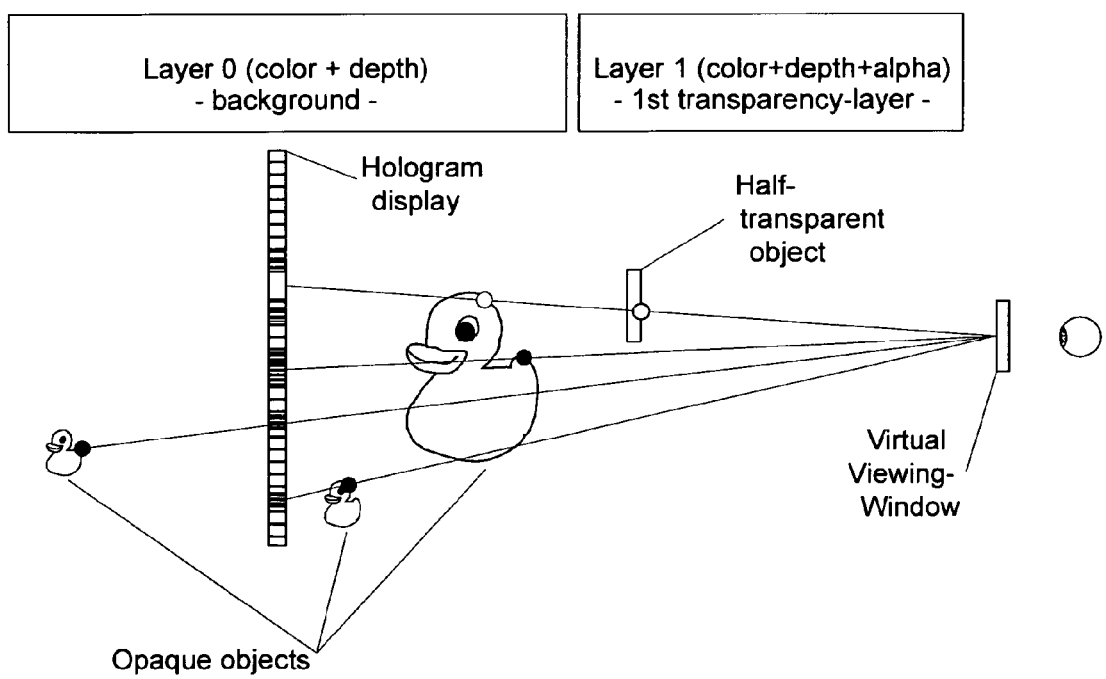

Reference is made to FIG. 6, which shows in FIG. 6 (a) a multiple scene-points along one single eye-display-ray are reconstructed consecutively and can be used to enable transparency-effects. FIG. 6 (b) shows an exemplary scene with one additional layer to handle transparent scene-points (more layers are possible). Transparent scene-points are stored in the first layer, the background-objects reside in the background-layer.

Finally, the layers have to be preprocessed to convert the colors of all scene-points according to their given alpha-values and influences from other scene-points behind. As an example there are two objects, one 100% red and opaque in background, one 100% white and half-transparent (50% transparency, alpha=0.5) in foreground, which just damps the light by 50%. After processing, the background object is damped—its new color is 50% red, the foreground-object is only 50% opaque, so its final color will be 50% white. When looking at such a reconstruction, the background-object will be darker, when occluded by the half-transparent white object in foreground, but both can be seen and focused.

So at the end after processing the alpha-values, the data handed over to the hologram-synthesis contains multiple views with multiple layers, each containing scene-points with just color and depth-values. Later, SHs will be created only for valid scene-points—only the parts of the transparency-layers actively used will be processed.

In other words, the reconstruction of transparent objects can be realized in the following way:

It is not directly possible to calculate holograms from computer generated scenes which comprise transparent objects. A transparent object can be e.g. glass, water, fog, dust particles or the like. Usually there is not generated a depth value for transparent objects, but only for opaque objects being located behind one or more transparent objects. It is required to have a depth value of an object if it has to be reconstructed using a hologram.

If a hologram is generated for two or more objects, wherein the objects are—at least partially—located behind each other as seen from one observer, these objects will be reconstructed in their respective distance (or depth coordinate) and are all visible. The object being located in front of the other objects does not influence the appearance of the other objects being located behind this object. This is, however, different for a transparent object being located in front of other objects. For example, only the red portions of light propagating from an object being located behind a red coloured transparent glass plate can pass the glass plate.

In one embodiment of the invention, the method comprises multiple stages. In a first stage, depth values of a complete three-dimensional scene which is to be reconstructed are generated without transparent objects of the three-dimensional scene. In a second stage, depth values of all the transparent objects of the three-dimensional scene are generated separately. The hologram (or the hologram data to be encoded into the hologram display/SLM [spatial light modulator]) is generated in multiple stages as well. Firstly, the opaque objects or opaque object points are processed by generating the sub-holograms and adding them up. Secondly, the transparent objects or transparent object points are processed by generating the sub-holograms and adding them up.

The colour values of opaque objects being manipulated or influenced by a transparent object are processed for a realistic representation or reconstruction in the following matter: instead of manipulating the wavelength of the light propagating on its way from an opaque object to the eye of the observer, the wavelength of the light or the colour from the opaque object is manipulated or changed—at the location of the opaque object—according to the characteristics of the transparent object being located in front of the opaque object. These manipulated colour values can be generated with methods for computer graphics.

The hologram is put together with information/data of object points of the opaque objects with manipulated colour/wavelength data (if located behind a transparent object) and of object points of the transparent objects in a multi stage process. All objects—transparent and/or opaque objects—are reconstructed in the correct depth and with the correct colour.

In contrast to the visualization of three dimensional scenes using an ordinary two dimensional display or using a stereoscopic display, for holographic reconstruction additional scene points can be generated in space, where the additional scene points might have the same x-y-coordinates (lateral position) but different z-coordinates (depth). Alternatively, additional scene points can be generated e.g. to realize dense volumes by means of depth, like fog or water. Those additional scene points being located on a single line in the viewing direction (with different depth values along the single line) or having a lateral position to which no object point has already been calculated. This is because only one additional sub-hologram needs to be generated for the additional object point and this sub-hologram needs to be added to all the other sub-holograms for generating an additional object point to a reconstructed three dimensional scene.

The method is very efficient and can be realized with only minor additional computational power. It can be carried out on a modern graphic board in real time or quasi real time including the computation of the hologram.

Figure 10:
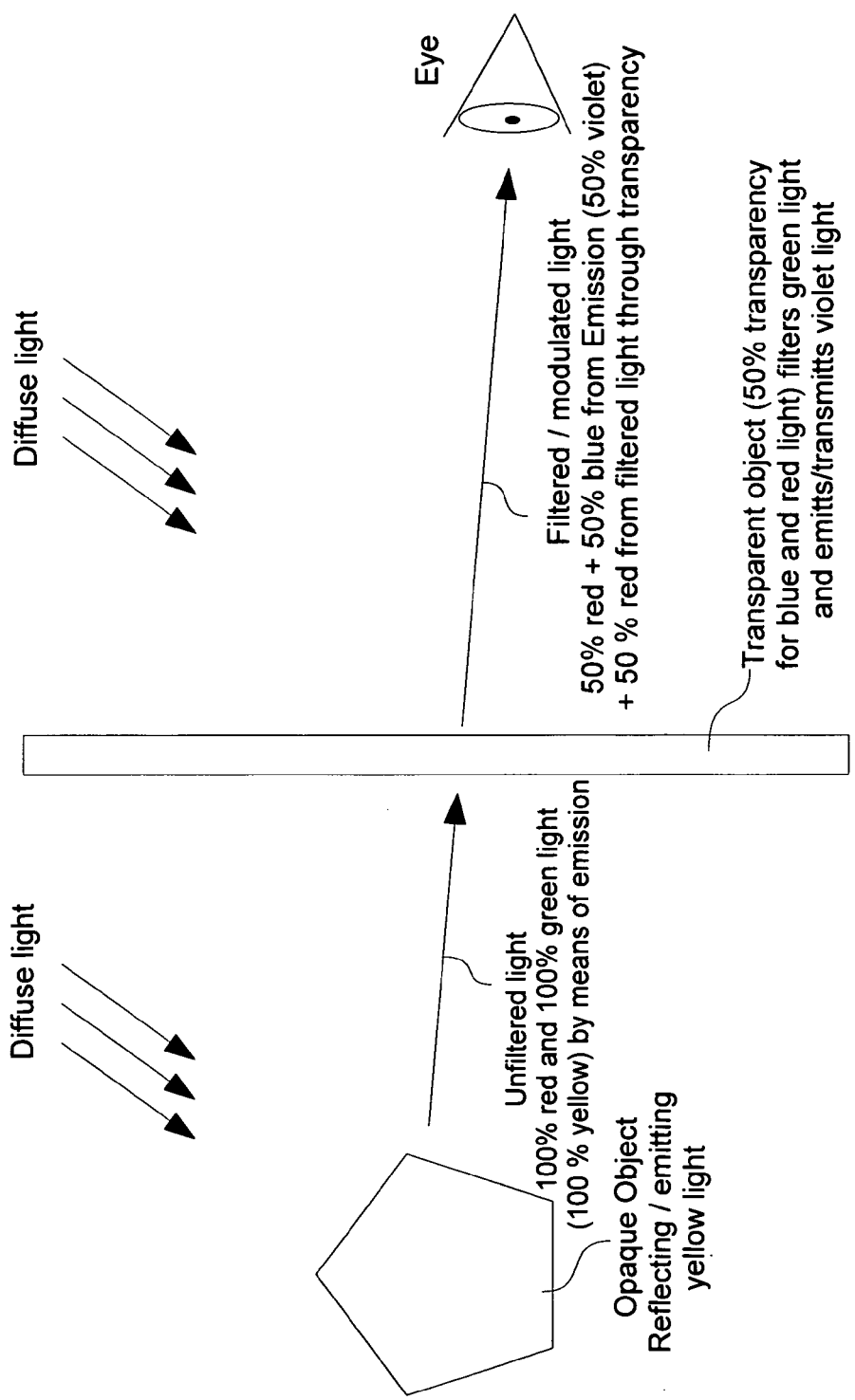
FIG. 10 shows the situation of an opaque object and a transparent object in real life/nature.
Figure 11:
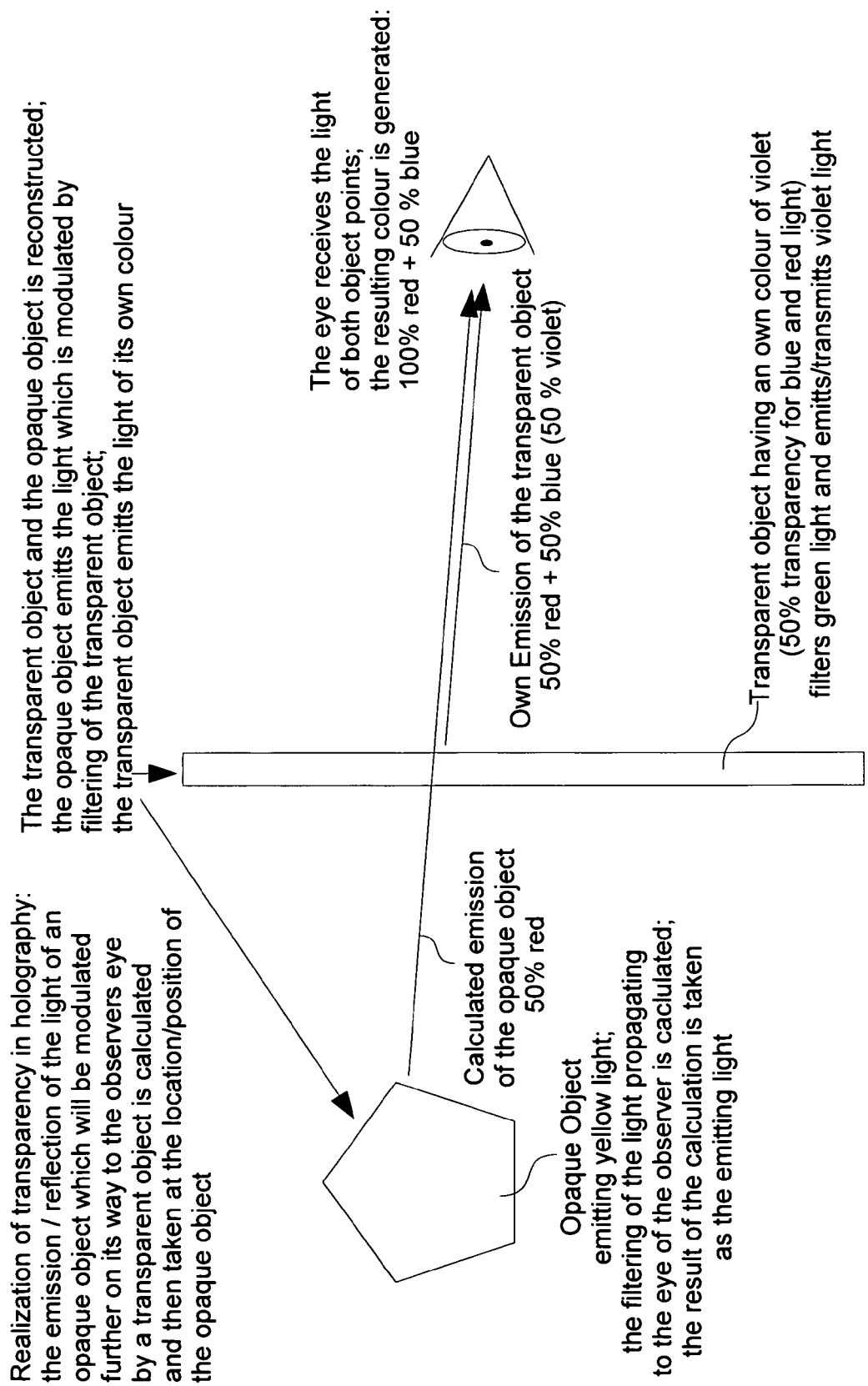
FIG. 11 is a figure for explaining calculation/generation of the reconstruction of the three-dimensional scene according to this invention.

FIG. 10 shows the situation of an opaque object and a transparent object in real life/nature. FIG. 11 shows the situation which is used for calculating/generating the reconstruction of the three-dimensional scene according to the invention.

4.4 A Holographic Video-Format

There are two ways to play a holographic video: By directly loading and presenting already calculated holograms or by loading the raw scene-points and calculating the hologram in real-time.

The first option has one big disadvantage: The data of the hologram-frames must not be manipulated by compression methods like video-codec's, only lossless methods are suitable. Through the very random nature of holographic data, lossless compression technologies are not effective in significantly reducing the data-volume to achieve streaming from a hard-drive or optical media, not to mention streaming over IP-networks.

To overcome this, SeeReal proposes to use the original scene-points stored inside the different views/layers as stated above. This in combination with SeeReal's real-time hologram calculation enables to use state-of-the-art video-compression technologies like H.264 or MPEG-4, which are more or less lossy dependent on the used bitrate, but provide excellent compression rates. The losses have to be strictly controlled especially regarding the depth-information, which directly influences the quality of reconstruction. But when choosing high bitrates, even then a compression-rate of around 1:10 with minimal but very acceptable losses is possible.

SeeReal developed and uses a simple video-frame format storing all important data to reconstruct a video-frame including color and transparency on a holographic display. This flexible format contains all necessary views and layers per view, to store colors, alpha-values and depth-values as sub-frames placed in the video-frame (see FIG. 7). Additional meta-information, stored in an xml-document or embedded into the video-container, contains the layout and parameters of the video-frames the holographic video-player needs for creating the appropriate hologram. This information for instance describes which types of sub-frames are embedded, their location and the original camera-setup, especially how to interpret the stored depth-values for mapping them into the 3D-coordinate-system of the holographic display.

Figure 7:
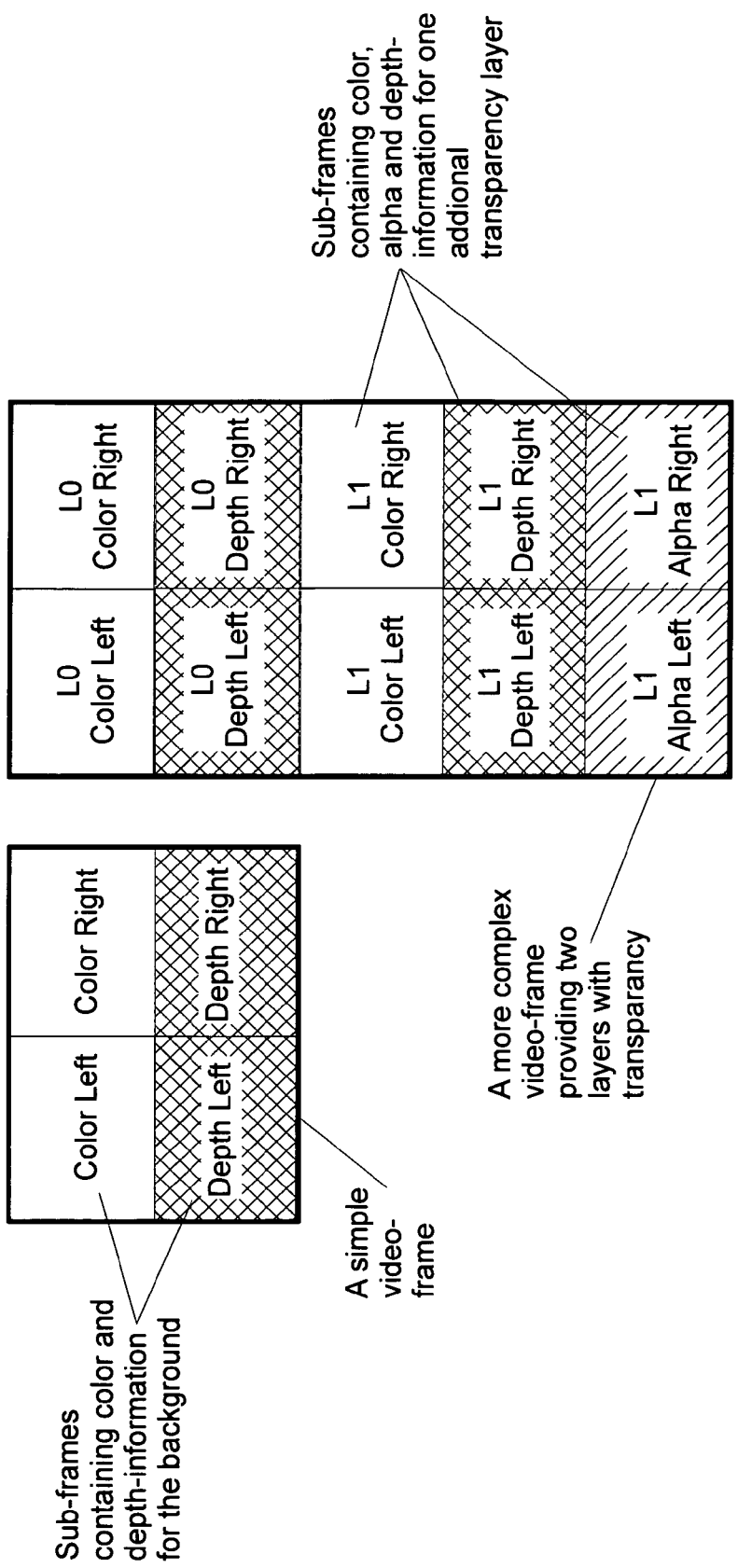
FIG. 7 shows typical example-layouts for video-frames.

Reference is made to FIG. 7, which shows typical example-layouts for video-frames. Sub-frames can be placed freely in the video-frame—a separate meta-information record provides the information, which sub-frames are embedded and their location in the video-frame.

This approach enables SeeReal to reconstruct 3D color-video with transparency-effects on holographic displays in real-time. The meta-information provides all parameters the player needs to create the hologram. It also ensures the video is compatible with the camera-setup and verifies the completeness of the 3D scene information (i.e. depth must be available).

5. Step 2: Hologram-Synthesis

The hologram-synthesis performs the transformation of multiple scene-points into a hologram, where each scene-point is characterized by color, lateral position and depth. This process is done for each view and color-component independently while iterating over all available layers—separate holograms are calculated for each view and each color-component.

For each scene-point inside the available layers, a Sub-Hologram SH is calculated and accumulated onto the hologram H, which consists of complex values for each hologram-pixel—a so called hologram-cell or cell. Only visible scene-points with an intensity/brightness b of b>0 are transformed, this saves computing time, especially for the transparency layers which are often only partially filled.

It is assumed the SLM provides the horizontal/vertical pitch $p_x/p_y$, the observer-distance between the hologram-plane and the observer is od and each scene-point provides its position (ox, oy) in the layer (which is also the Sub-Hologram-position in the hologram), its depth d and brightness b at the wavelength λ (according to the currently processed color-component).

At first the size of the Sub-Hologram $$SH_{w,h} = \frac{|F|\lambda}{p_{x,y}^2}$$

in the display-plane (the hologram-plane) is calculated. Then for each cell SH(x, y) at the discrete cell-position (x, y) inside the SH, the complex value $SH(x, y) = Ae^{-j\phi(x, y)}$ is computed, the phase φ(x, y) and amplitude A are given by $$\varphi(x, y) = \frac{\pi}{\lambda F}(x^2 p_x^2 + y^2 p_y^2) + \varphi_0 \text{ and } A = \frac{b}{\sqrt{SH_w SH_h}}$$

Such a SH describes a holographic lens with the focal length $$F = \frac{od \cdot d}{od - d}$$

to reconstruct the given scene-point at the encoded distance d. The term $\phi(0 \leq \phi \leq \phi_0 \leq 2\pi)$ is an initial phase unique for each scene-point, which is typically random. The calculated SH is finally added up to the hologram H at the SHs location (ox, oy) in the hologram H. The position (ox, oy) is the center-position of the Sub-Hologram SH in the hologram H, which is defined by the ray crossing the hologram/display-plane, starting in the VW and passing the scene-point's position in space and corresponds to the scene-point's 2D-position in the layer. Now H represents the wave-front which will reconstruct our 3D-scene.

In the next steps, the transformation of complex values to displayable real-values, the hologram-encoding, has to be performed to enable writing the hologram into the SLM.

6. Step 3: Hologram-Encoding

Encoding is the process to prepare a hologram to be written into a SLM, the holographic display. SLMs normally cannot directly display complex values, that means they cannot modulate and phase-shift a light-wave in one single pixel the same time. But by combining amplitude-modulating and phase-modulating displays, the modulation of coherent light-waves can be realized. The modulation of each SLM-pixel is controlled by the complex values (cells) in a hologram. By illuminating the SLM with coherent light, the wave-front of the synthesized scene is generated at the hologram-plane, which then propagates into the VW to reconstruct the scene.

Different types of SLM can be used for generating holograms, some examples are: SLM with amplitude-only-modulation (detour-phase modulation) using i.e. three amplitude values for creating one complex value[4], SLM with phase-only-modulation by combining i.e. two phases[5] or SLM combining amplitude and phase-modulation by combining one amplitude- and one phase-pixel. Latter could be realized by a sandwich of a phase and an amplitude-panel[6].

So, dependent of the SLM-type, a phase-amplitude, phase-only or amplitude-only representation of our hologram is required. Each cell in a hologram has to be converted into the appropriate representation. After writing the converted hologram into the SLM, each SLM-pixel modulates the passing light-wave by its phase and amplitude.

7. Step 4: Post-Processing

The last step in the processing chain performs the mixing of the different holograms for the color-components and views and presents the hologram-frames to the observers. There are different methods to present colors and views on a holographic display.

One way would be the complete time sequential presentation (a total time-multiplexing). Here all colors and views are presented one after another even for the different observers in a multi-user system. By controlling the placement of the VWs at the right position synchronously with the currently presented view and by switching the appropriate light-source for $\lambda$ at the right time according to the currently shown hologram encoded for $\lambda$, all observers are able to see the reconstruction of the 3D scene. Another way is the independent presentation of the views and time-multiplexing of colors with two different SLM, such a system has already been shown by SeeReal at SID Long Beach in 2007[7].

Two further methods, implemented in our current prototypes, are based on mixing colors and views in one single frame, or on mixing views in one single frame and presenting colors sequentially[8]. For both, single-parallax holograms in vertical direction (VPO) are used, while in horizontal direction the different views (and colors) are multiplexed using vertical interlacing.

There are also many other ways and methods to represent the colors and views for all observers. In general, the post-processing is responsible to format the holographic frames to be presented to the observers.

8. Implementation

All the processing-steps described above have been implemented as general software-modules inside SeeReal's holographic reference software-system. For the different prototypes the required code-paths have been optimized for GPU- and FPGA-computing to be running on off-the-shelf PC-hardware and on SeeReal's dedicated FPGA-platform. Both platforms are presented below but at first the specification of our 20 inch direct view holographic prototype will be given.

8.1 SeeReal's Direct View Holographic Prototype

SeeReal's 20 inch direct view prototype is a full color holographic 3D display using 1D vertical encoding (VPO). It provides viewing-window tracking by using the integrated accurate and fast eye-tracking system, which delivers the 3D-eye-positions of up to four observers 60 times per second with an accuracy of +/−2.5 mm. But present holographic prototypes are designed for one observer only. The eye-tracking software is running either on a standard PC or fully integrated into the display using an embedded DSP/FPGA-solution.

The holographic panel has a resolution of 2048×7680 amplitude modulating pixels and is running with 60 Hz. The observer-distance is currently set at approximately 2 m due to the (for holography) relatively coarse pixel pitch of the off-the-shelf LCD. By using detour-phase encoding[4], the pitch for one complex pixel (cell) is 156×156 µm—this leads to the corresponding VW of 8 mm in vertical direction. In horizontal direction the holograms for both eyes are spatially separated. A fixed optical system creates horizontal sweet spots of 32.5 mm width for each eye, which are shifted in horizontal direction according to the observer's movements. So an observer can freely move the head in horizontal and vertical direction without losing the holographic view. The holograms for left and right eye are spatially multiplexed into the displayed frame while colors are sequentially presented. For each color-component (red, green, blue) a different frame for the appropriate wavelength is shown.

It is possible to reconstruct 512×2560 scene-points per layer, but at the observer-distance of 2 m, a human eye cannot resolve a 3D scene resolution of 512×2560 on a 20 inch display. Accordingly, the 3D scene resolution is arbitrarily limited to 512×640 scene points per layer—this also provides a more common format (3:4). For a larger LCD, the 3D scene resolution can easily be scaled to Full-HD or higher. The depth-range of 3D scenes usually begins approx. 1 meter in front of the hologram display and can go to infinity behind the display.

8.2 Real-Time Holography on a PC

Motivation for using a PC to drive a holographic display is manifold: A standard graphics-boards to drive the SLMs using DVI can be used, which supports the large resolutions needed. Furthermore a variety of off-the-shelf components are available, which get continuously improved at rapid pace. The creation of real-time 3D-content is easy to handle using the widely established 3D-rendering APIs OpenGL and Direct 3D on the Microsoft Windows platform. In addition useful SDKs and software libraries providing formats and codec's for 3D-models and videos are provided and are easily accessible.

When using a PC for intense holographic calculations, the main processor is mostly not sufficiently powerful. Even the most up-to-date CPUs, do not perform calculations of high-resolution real-time 3D holograms fast enough, i.e. an Intel Core i7 achieves around 50 GFlop/s[9]. So it is obvious to use more powerful components—the most interesting are graphics processing units (GPUs) because of their huge memory bandwidth and great processing power, despite some overhead and inflexibilities. As an advantage, their programmability, flexibility and processing power have been clearly improved over the last years.

8.3 Real-Time Holography Using GPUs

Based on Microsoft's Direct 3D 9, the complete holographic processing pipeline as presented above has been implemented along with appealing interactive applications. Everything runs on a PC with one NVIDIA GeForce 285 GTX, driving our 20" holographic 3D direct view prototype. Almost all calculations are done on the graphics processing unit (GPU), the CPU is only used to control the program flow and to supply parameters for calculations. For most of the steps, special pixel- and vertex-shader-programs[11] have been implemented, which are switched from step to step to perform the appropriate algorithm. Shader-programs are small code-fragments written in a C-like language (i.e. HLSL when using Direct 3D). When compiled and uploaded to the GPU for execution, they run in parallel inside the shader-cores of the GPU to process vertices or fragments/pixels inside the graphics-pipeline. A modern GPU has typically more than 200 shader-cores, with each one capable to perform typical 4-dimensional vector-operations at a high frequency at around 1 GHz.

The reason why the direct use of Direct 3D towards other GPGPU-techniques (general purpose computation on graphics processing units[13]) like CUDA[12] was chosen is the greater flexibility to use any feature a GPU provides and the straightforward interface to the 3D-content created in real-time by the application-module.

Figure 8:
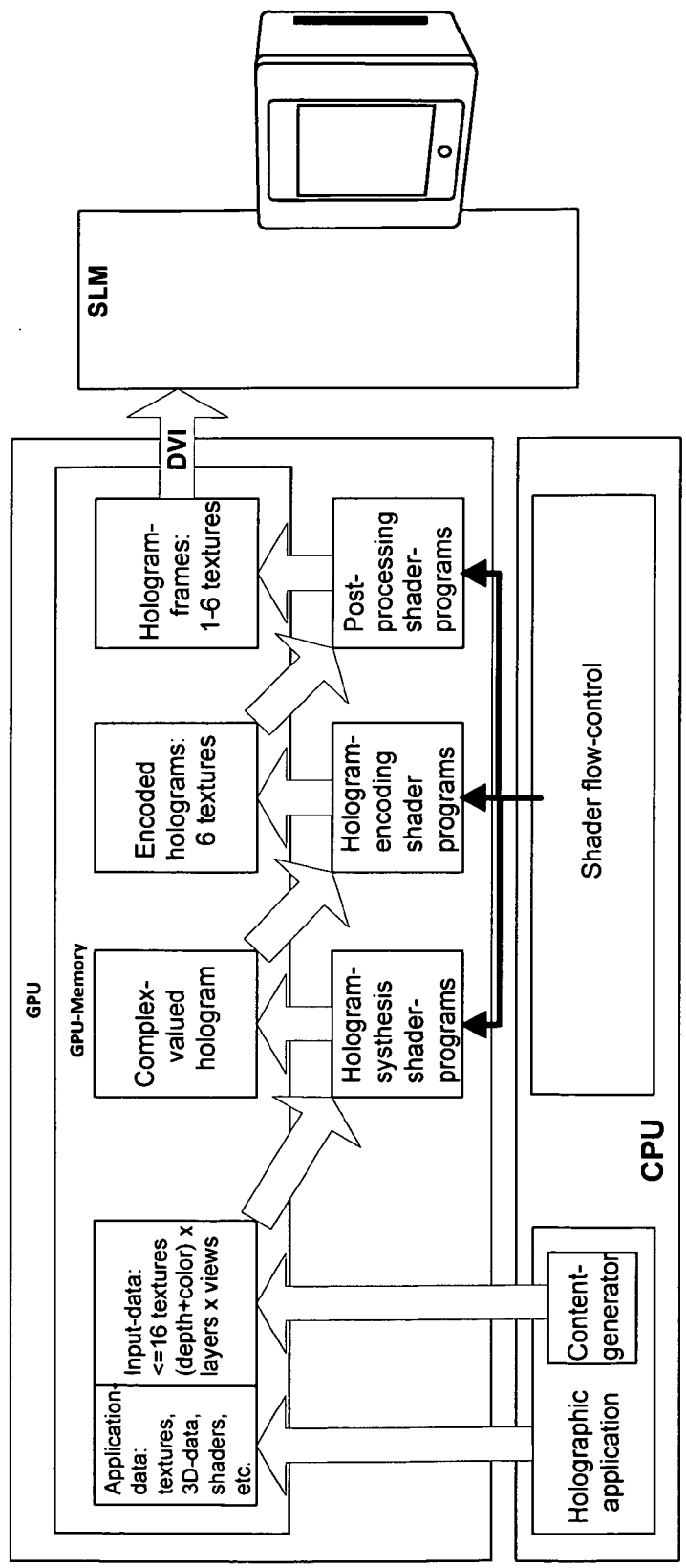
FIG. 8 shows an overview of the GPU-based processing pipeline.

Our solution, utilizing the GPU is very flexible and parameterizable. A Windows-SDK has been developed by SeeReal providing a simple API encapsulating all aspects of holographic computing, so any application-designer just needs to concentrate on the content itself. All things related to virtual cameras, hologram-synthesis, hologram-encoding and post-processing for a specific holographic display are hidden and automatically handled by the software-system. FIG. 8 gives an overview of the GPU-based processing pipeline.

The GPU-solution used for SeeReal's 20" direct view prototype works as follows: In the first module, the content-creation—part of the holographic application—two views are created, each consisting of up to four layers, with each layer storing 512×640 scene-points and each scene-point providing color, depth and alpha-information. The holographic application may use all functions and features the Direct 3D-API provides, such as its own shader-programs for example. The data generated—up to 16 textures in GPU-memory, two for each layer providing depth and color with alpha—is handed over to the next instance. This is the only module an application-designer must create and implement, all other parts are provided by the SDK.

Reference is made to FIG. 8, which shows an overview of the data-flow in our GPU-solution.

The next module, the hologram-synthesis, processes each layer to apply the transparency-effects given by the alpha-value and performs some depth-sorting for the case that the depths between different layers have not been sorted by the application. Then for each 3D scene-point in each layer, a Sub-Hologram is generated and positioned using a vertex-shader-program. Each Sub-Hologram is processed by a pixel-shader-program performing the calculation of phases and amplitudes for each hologram-cell (complex value) as described above. Each calculated cell is then accumulated onto the resulting complex-valued hologram. This complex-valued hologram is implemented using two floating-point textures in GPU-memory, one for the real part, one for the imaginary part.

In our first prototype versions presented at SID in 2007, a lookup-table approach was used, where standardized Sub-Holograms had been pre-calculated for each of 256 discrete depth-steps. This was done to overcome the limited processing power of the GPUs at this time—i.e. the NVIDIA 7900 GTX. Until now, graphics processing units have been improved rapidly, but more in the direction of calculation power than on the memory-bandwidth. Now the combination of improved GPUs and optimized SeeReal algorithms enables direct computing of Sub-Holograms with greater quality, flexibility and efficiency—the dynamic Sub-Hologram size and direct computation leads to more efficient calculations, the nearly unlimited depth-resolution provided by the GPU (typically 24 bit) is now used to provide a finer depth-resolution in the reconstruction (esp. for large depth-ranges) and memory bandwidth does no more limit the calculations.

In the third step hologram-encoding, the complex values are encoded to create the final, SLM-compatible representation using detour-phase modulation[4], which is also done using another set of pixel-shader-programs.

Finally the six holograms, two views with three holograms (for the color-components) each, are multiplexed for presentation on the SLM. Three SLM-frames, one for each color-component are created by multiplexing two views for each color-component into one frame using vertical interlacing. Then these three frames are sequentially displayed.

8.4 Real-Time Holography Using an FPGA

Another step in SeeReal's development of holographic 3D solutions was optimizing the software for porting to a field programmable gate array (FPGA). The motivation was to realize an autonomous system, to be integrated into any display. For this, a custom FPGA-board utilizing a Stratix III FPGA from Altera has been designed. The advantage of FPGAs against CPUs or GPUs is the mixing of best-of-both-worlds—much better parallelism than in CPUs combined with greater programming flexibility than in GPUs. Nonetheless, the complex programming model of FPGA solutions leads to longer development cycles compared to PC-based developments.

On the application-side both solutions use a PC to create the content, using the content-creation-module like already described above. But for this solution, the data generated is transferred to the FPGA-board using DVI-Frames instead of textures inside GPU-memory, by packing the color and depth-information for both views inside one single DVI-frame. So a set-top box or gaming console would also be appropriate to use as content-source. Handling of more than one transparency layer will be realized by expanding the DVI-frame-size to include the information for up to four layers similar to the proposed video-frame format described above.

Figure 9:
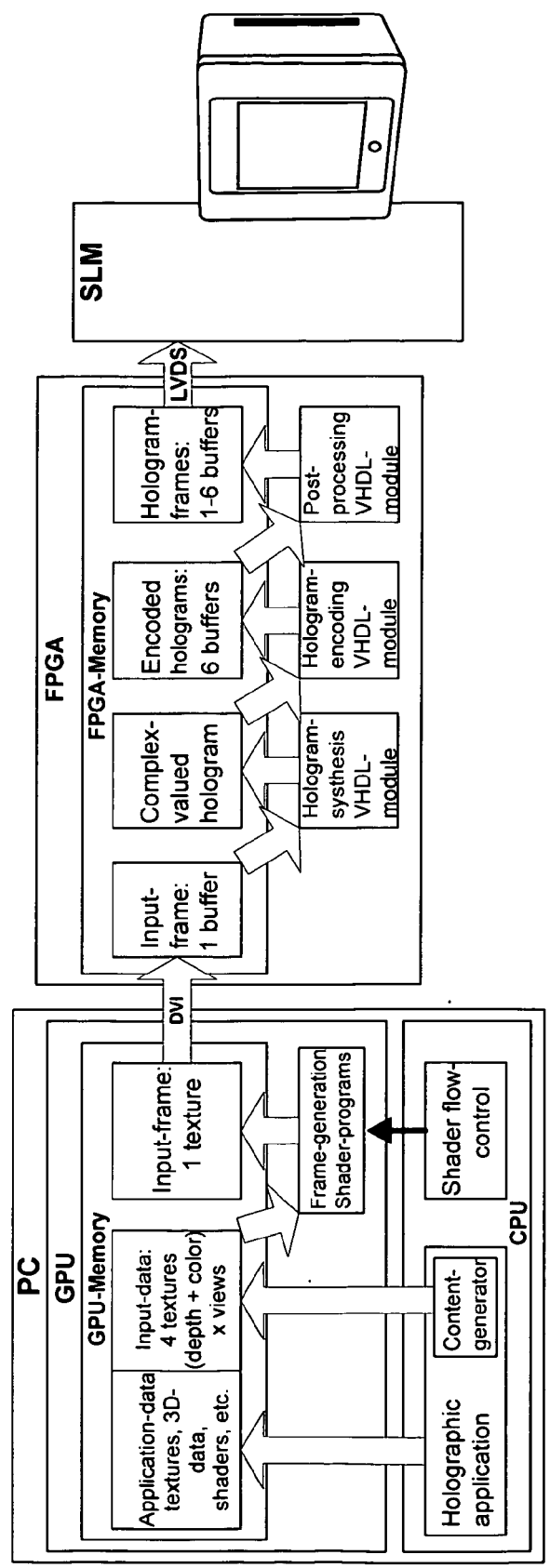
FIG. 9 shows an overview of the FPGA-based processing pipeline.

Reference is made to FIG. 9, which shows an overview of the data-flow in our FPGA-solution.

Modules for calculating Sub-Holograms, accumulation and encoding, as well as post-processing have been implemented using VHDL. Today this solution provides the same functionality as SeeReal's GPU-version, except the pending support for layers. The FPGA-board directly drives the SLM using the LVDS-interface for presenting the frames (see FIG. 9).

8.5 Applications

With those solutions available on GPU as well as FPGA, SeeReal is able to show live-encoded high resolution life action 3D-video with full display-frame-rate of 60 Hz, streamed frame by frame from a PC's hard-drive using a standard MPEG-4 codec for video-decoding. Each frame contains raw color, depth and alpha-information for two views and 4 layers—background plus 3 transparency-layers—which are heavily utilized. More than 80% of all available scene-points are used in the transparency-layers for meaningful load comparisons.

Furthermore real-time applications have been developed and demonstrated showing computer-generated 3D-models based on standard formats and complex interactive 3D-scenes consisting of multiple models in a detailed 3D-environment. For enhancing the user experience and to simplify the interactions, selected modern human-machineinterfaces like a 3D-space-mouse and the Nintendo Wii controller have been integrated.

9. Results

Based on SeeReal's principles for holographic 3D displays and corresponding proprietary algorithms, both solutions GPU and FPGA are capable of driving SeeReal's 20 inch holographic 3D direct view prototype with the full SLM-frequency of 60 Hz using spatial view and sequential color multiplexing. Furthermore and already today, the solution is capable of driving scaled up display hardware (higher SLM resolution, larger size) with the correspondingly increased pixel quantity.

The high-resolution, full frame rate GPU-solution runs on a PC with a single NVIDIA GTX 285, SeeReal's FPGA-solution uses one Altera Stratix III to perform all the holographic calculations. Transparency-effects inside complex 3D scenes and 3D-videos are supported. Even for complex high-resolution 3D-content utilizing all four layers, the frame rate is constantly above 60 Hz. Content can be provided by a PC and esp. for the FPGA-solution by a set-top box, a gaming console or the like—which is like driving a normal 2D- or 3D-display.

Both solutions have a very scalable design to already incorporate capabilities for more and larger Sub-Holograms, especially for Sub-Holograms spreading in both dimensions (full-parallax holography). Even with the current solutions the calculation of full-parallax color holograms in real-time is achievable and has been tested internally. Dependent from 3D-scene complexity there may be some restrictions to smaller depth-ranges according to the available computing power. Already today, by using multiple GPUs (NVIDIA SLI or AMD CrossFire) or linking multiple FPGAs, the calculation-performance can be sufficiently increased easily. As an example, NVIDIAs SLI has been applied to connect two GeForce 285 GTX GPUs which increased the hologram-calculation frame rate by a Factor of 1.9, proving the good scalability of this solution.

These solutions enable SeeReal to show complex 3D-videos as well as complex interactive 3D-scenes, which are all holographically encoded on-the-fly. This now allows focusing more on the development of holographic content and applications along with appropriate formats for streaming, gaming or holographic TV, than on the technology itself.

10. Conclusion and Further Development

This paper presented our solution using the novel Sub-Hologram approach, which allows the calculation of holograms in real-time when adapted to GPUs or FPGA-hardware for driving holographic displays showing complex and interactive 3D-content.

Further developments will concentrate on new technologies in the area of GPUs like Direct 3D 11 with the newly introduced Compute-Shaders and OpenGL ¾ in combination with OpenCL, to improve the efficiency and flexibility of SeeReal's GPU-solution. SeeReal's FPGA-solution will be completed in 2010 including the support for multiple transparency-layers. Furthermore the VHDL-designs will be optimized for the development of dedicated holographic ASICs.

The development or adaption of suitable formats for streaming holographic video (3D-TV) and 3D-content along with the integration of SeeReal's technology into existing game- or application-engines will be another focus.

REFERENCES

[1] Goodman, J. W., [Introduction to Fourier Optics], 2nd edn, McGraw-Hill, New York (1996).
[2] Hoffman, D. M., Girshick, A. R., Akeley, K. & Banks, M. S., "Vergence-accommodation conflicts hinder visual performance and cause visual fatigue," J. Vis. 8(3), 1-30 (2008).
[3] St-Hilaire, P., Benton, S. A., Lucente, M. E., Sutter, J. D. & Plesniak, W. J., "Advances in holographic video," Proc. SPIE 1914, pp. 188-196 (1993).
[4] Burckhardt, C. B., "A Simplification of Lee's Method of Generating Holograms by Computer," Appl. Opt. 9(8), 1949-1949 (1970).
[5] Hsueh, C. K. & Sawchuk, A. A., "Computer-generated double-phase holograms," Appl. Opt. 17(24), 3874-3883 (1978).
[6] Gregory, D. A., Kirsch, J. C. & Tam, E. C., "Full complex modulation using liquidcrystal televisions," Appl. Opt. 31(2), 163-165 (1992).
[7] N. Leister, A. Schwerdtner, G. Fütterer, S. Buschbeck, J.-C. Olaya and S. Flon, "Full-color interactive holographic projection system for large 3D scene reconstruction," Proc. SPIE 6911, 69110V (2008).
[8] Häussler, R., Reichelt, S., Leister, N., Zschau, E., Missbach, R. & Schwerdtner, A., "Large real-time holographic displays: from prototypes to a consumer product," Proc. SPIE 7237, p. 72370S (2009).

The invention claimed is:

1. A method for computing holographic encoding values for an optical light modulator of a holographic system for the reconstruction of three-dimensional scenes, which include objects with transparent properties, for at least one observer eye, comprising:

dividing the three-dimensional scene into individual object points and determining the coordinates of these object points, determining a virtual observer position which corresponds with the position of a selected observer eye where the three-dimensional scene is apparently perceived, determining all object points to be encoded which are not fully covered by other opaque object points seen from the virtual observer position as visible real or virtual object points, sorting of all visible object points to be encoded which are seen at the same angle from the virtual observer position by their distance to the virtual observer position, determining the actual brightness of each visible object point, with considering the location and intensity of all real and virtual light sources of the scene at the position of those object points at the angle at which they are seen from the virtual observer position, where the physical properties of the objects including the real and virtual light sources are taken into account, determining for each visible object point to be encoded an apparent brightness value with which the object point is perceived at the virtual observer position, with considering its actual brightness at its actual position, the distance to the virtual observer position and the transparency properties of all objects or object points which are situated between that visible object point and the virtual observer position, determining in addition to the apparent brightness value, for each object point to be encoded, an apparent color value with which the object point is perceived at the virtual observer position considering its actual color value at its position and the transparency properties of all objects or object points which are situated between that visible object point and the virtual observer position, separately computing, for each of the visible object points, the encoding values as a sub-hologram with its respective apparent brightness value and its apparent color value such that it is reconstructed in the holographic system at a position corresponding to a visible point within a reconstruction volume of the hologram system with the apparent brightness value and the apparent color value, so that opaque and transparent object points can be perceived separately at their respective positions, and computing the apparent brightness values and apparent color values of the visible object point with which the object point is perceived at the virtual observer position by considering spatial transparency distributions of the objects or object points which are situated between that object point and the virtual observer position, where their spectral interdependencies can be taken into account.

2. The method according to claim 1, wherein additional virtual object points are computed which are virtually generated due to reflection, remission or scattering as a result of an interaction between light of at least one virtual or real light source and object points of the three-dimensional objects of the scene to be reconstructed, where the spectral properties of the objects and virtual or real light sources can be considered, and that apparent brightness values or apparent brightness and colour values with which the object point is perceived at the virtual observer position are computed for those visible virtual object points like for visible real object points and that their encoded values are separately computed as a sub-hologram with their respective apparent values.

3. The method according to claim 1, wherein the locations of the object points are corrected in relation to the virtual observer position due to optical properties such as reflection, refraction or diffraction at objects or object points which are situated between the virtual observer position and an object point to be corrected, and that the apparent brightness values or the apparent brightness and colour values are computed for those corrected positions and that the encoding values for such visible object points are computed separately with the respective apparent values.

4. The method according to claim 1, wherein the apparent brightness values or the apparent brightness and colour values of a visible object point with which the object is perceived at the virtual observer position are computed with the help of stochastic methods and the probabilities of absorption, diffusion, reflection and diffraction of at least one of the transparent and reflecting and diffusing and diffracting and refracting objects or object points which are situated between that object point and the virtual observer position, where their spectral interdependencies can be taken into account.

5. The method according to claim 1, wherein at least one transparency property of at least one single object which is situated between an object point and the virtual observer position is considered in an amplified or weakened form in the computation of the apparent brightness values or the apparent brightness and colour values of visible individual object points in order to improve or reduce the visibility of the object point.

6. The method according to claim 1, further comprising computing the encoding values for a sound reproduction system comprising at least two sound generating means for the reconstruction of three-dimensional sound fields comprising spatial and temporal varying sound values of three-dimensional scenes which include objects with sound-absorbing properties for at least one listener ear, where the computing of the encoding values for a second reproduction system comprises:

dividing the three-dimensional scene into individual object points, the individual object points being capable of influencing the sound, and the coordinates of these object points are determined, determining a virtual listener position which corresponds with the position of a selected listener ear where the three-dimensional scene is apparently perceived acoustically, determining all object points which are not fully covered by other fully sound-absorbing object points in the direction of the virtual listener position, sorting all object points which are located in the direction from the virtual listener position by their distance to the virtual listener position, determining the actual loudness, pitch and sound transit time at the location of each object point being capable of influencing the sound, with considering the location and intensity of all real and virtual acoustic sources of the scene at the position of those object points at the angle at which they are perceived from the virtual listener position, where the physical properties of the objects including the real and virtual acoustic sources are taken into account, determining, for each object point being capable of influencing the sound the apparent loudness, pitch and sound transit time with which the sound is perceived at the virtual listener position considering its actual loudness, pitch and sound transit time at the position of the object point being capable of influencing the sound, the distance to the virtual listener position and the absorption properties of all objects or object points which are situated between that object point and the virtual listener position, and separately computing each sound value comprising this loudness, pitch and sound transit time such that its reconstruction with the sound reproduction system can be perceived at the location of the virtual listener position with this apparent loudness value, pitch and sound transit time.

7. A computing device for computing the encoding values for an optical light modulator or for a sound generating means of a holographic system for the reconstruction of three-dimensional scenes, which include objects with transparent properties, for at least one observer eye or at least one listener ear, where the computing device comprises at least one programmable processor core configured to carry out the method of claim 1.

8. The computing device according to claim 7, further comprising at least one of the following: at least one programmable logic device of any type and at least one application-specific integrated circuit and at least one digital signal processor, where at least two of these devices can be combined in one integrated circuit.

9. The computing device according to claim 7 wherein this computing device is part of a system controller of a display for the representation of three-dimensional scenes.

10. The computing device according to claim 7, wherein this computing device is part of a general computing system which can be used for the computation of three-dimensional scenes.

* * * * *